US012781524B2

(12) United States Patent
Ebisawa et al.

(10) Patent No.: US 12,781,524 B2
(45) Date of Patent: Nov. 3, 2026

(54) HANDHELD POWER TOOL FOR CONCRETE VIBRATOR

(71) Applicant: Koki Holdings Co., Ltd., Tokyo (JP)

(72) Inventors: Yuuki Ebisawa, Ibaraki (JP); Hideki Kobayashi, Ibaraki (JP); Tomoyoshi Yokota, Ibaraki (JP); Natsumi Ebisawa, Ibaraki (JP); Takafumi Itou, Ibaraki (JP); Syota Hiratsuka, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 1219 days.

(21) Appl. No.: 17/774,475

(22) PCT Filed: Sep. 25, 2020

(86) PCT No.: PCT/JP2020/036450
§ 371 (c)(1),
(2) Date: May 4, 2022

(87) PCT Pub. No.: WO2021/090605
PCT Pub. Date: May 14, 2021

(65) Prior Publication Data

US 2022/0389727 A1 Dec. 8, 2022

(30) Foreign Application Priority Data

Nov. 7, 2019 (JP) ................................ 2019-202086
Mar. 11, 2020 (JP) ................................ 2020-041620

(51) Int. Cl.
*E04G 21/08* (2006.01)
*B01F 31/44* (2022.01)
(Continued)

(52) U.S. Cl.
CPC .............. *E04G 21/08* (2013.01); *B01F 31/44* (2022.01); *B01F 33/5011* (2022.01); *B06B 1/16* (2013.01);
(Continued)

(58) Field of Classification Search
CPC ....... E04G 21/063; E04G 21/08; B01F 31/44; B01F 33/5011; B06B 1/16; B06B 3/00;
(Continued)

(56) References Cited

U.S. PATENT DOCUMENTS 5,725,304 A * 3/1998 Inai ......................... H02K 9/26
366/120
8,439,600 B2 * 5/2013 Brening .................. E01C 19/38
404/114
(Continued)

FOREIGN PATENT DOCUMENTS

CN 102386348 3/2012
CN 206060105 3/2017
(Continued)

OTHER PUBLICATIONS

"Search Report of Europe Counterpart Application", issued on Nov. 2, 2022, p. 1-p. 7.
(Continued)

*Primary Examiner* — Charles Cooley
(74) *Attorney, Agent, or Firm* — JCIPRNET

(57) ABSTRACT

Provided is a user-friendly power tool. The power tool 1 comprises: a battery pack mount 2*c* to which a battery pack 4 can be attached and detached; and a cover 17 that can cover the battery pack 4, mounted on the battery pack mount 2*c*, and the battery pack mount 2*c* so as to allow opening and closing. The wall 23 of the battery pack mount 2*c* is provided with a correcting part 23*a* that is capable of correcting inward warping of both the left and right side
(Continued)

surfaces of the cover 17, which are the longitudinal direction surfaces. The lower edge of the correcting part 23*a* has a rounded shape.

12 Claims, 15 Drawing Sheets

(51) Int. Cl.

| | |
|---|---|
| ***B01F 33/501*** | (2022.01) |
| ***B06B 1/16*** | (2006.01) |
| ***B25F 5/02*** | (2006.01) |
| ***H01M 50/247*** | (2021.01) |
| ***H01M 50/271*** | (2021.01) |
| ***H02K 7/06*** | (2006.01) |
| ***H02K 7/14*** | (2006.01) |
| ***H02K 11/00*** | (2016.01) |

(52) U.S. Cl.
CPC ............. *B25F 5/02* (2013.01); *H01M 50/247* (2021.01); *H01M 50/271* (2021.01); *H02K 7/061* (2013.01); *H02K 7/145* (2013.01); *H02K 11/0094* (2013.01); *H01M 2220/30* (2013.01)

(58) Field of Classification Search
CPC .... B06B 1/04; B25F 5/02; B25F 5/00; H01M 50/247; H01M 50/271; H01M 2220/30; H02K 7/061; H02K 7/145; H02K 11/0094
USPC .................................................. 366/120–128
See application file for complete search history.

(56) References Cited

U.S. PATENT DOCUMENTS

| | | | | |
|---|---|---|---|---|
| 12,129,673 | B2 * | 10/2024 | Gallagher | B01F 31/44 |
| 12,195,982 | B2 * | 1/2025 | Gallagher | E04G 21/063 |
| 12,283,706 | B2 * | 4/2025 | Yueda | B01F 35/3204 |
| 2002/0050364 | A1 * | 5/2002 | Suzuki | B25B 23/1405 173/1 |
| 2003/0174449 | A1 | 9/2003 | Yamamoto | |
| 2012/0052356 | A1 * | 3/2012 | Sugiura | H01M 50/244 429/100 |
| 2019/0006980 | A1 * | 1/2019 | Sheeks | H01M 10/4207 |
| 2021/0148126 | A1 * | 5/2021 | Gallagher | E04G 21/08 |
| 2022/0021065 | A1 * | 1/2022 | Yueda | H01M 50/247 |
| 2022/0290451 | A1 * | 9/2022 | Yueda | E04G 21/08 |
| 2022/0341198 | A1 * | 10/2022 | Gallagher | E04G 21/066 |
| 2022/0389726 | A1 * | 12/2022 | Gallagher | E04G 21/08 |
| 2022/0389727 | A1 * | 12/2022 | Ebisawa | E04G 21/08 |
| 2024/0039371 | A1 * | 2/2024 | Minkebige | H02P 29/60 |
| 2024/0044158 | A1 * | 2/2024 | Ineyama | E04G 21/08 |
| 2024/0318441 | A1 * | 9/2024 | Janecke | H01M 50/256 |

FOREIGN PATENT DOCUMENTS

| | | | | |
|---|---|---|---|---|
| EP | 4306744 A2 * | 1/2024 | | E04G 21/08 |
| JP | H09158483 | 6/1997 | | |
| JP | H11333763 | 12/1999 | | |
| JP | 2001269874 | 10/2001 | | |
| JP | 2003266334 | 9/2003 | | |
| JP | 2016010835 | 1/2016 | | |
| WO | 2016002293 | 1/2016 | | |
| WO | WO-2016002293 A1 * | 1/2016 | | B25B 23/14 |
| WO | 2019027115 | 2/2019 | | |

OTHER PUBLICATIONS

"International Search Report (Form PCT/ISA/210) of PCT/JP2020/036450", mailed on Nov. 24, 2020, with English translation thereof, pp. 1-4.
"Office Action of China Counterpart Application", issued on Apr. 28, 2023, submit with machine English translation thereof, pp. 1-10.
"Office Action of China Counterpart Application", issued on Apr. 8, 2024, with English translation thereof, p. 1-p. 15.

* cited by examiner

Replacement Sheet

HANDHELD POWER TOOL FOR CONCRETE VIBRATOR

CROSS-REFERENCE TO RELATED APPLICATION

This application is a 371 application of the International PCT application serial no. PCT/JP2020/036450, filed on Sep. 25, 2020, which claims the priority benefits of Japan Patent Application No. 2019-202086, filed on Nov. 7, 2019 and Japan Patent Application No. 2020-041620, filed on Mar. 11, 2020. The entirety of each of the above-mentioned patent applications is hereby incorporated by reference herein and made a part of this specification.

TECHNICAL FIELD

The invention relates to a handheld power tool, such as a concrete vibrator.

RELATED ART

Concrete vibrators have been used in driving and compaction work of fresh concrete in construction sites, etc. Patent Literature 1 as follows discloses a battery-type concrete vibrator. In such concrete vibrator, a rechargeable battery package is detachably mounted to the lower part of a handle housing. A battery cover is attached to the outer side of the battery package. The battery cover is rotatably supported by the front lower end of the handle housing. The battery cover has a claw catching a collar part of the rear lower end of the handle housing.

CITATION LIST

Patent Literature

[Patent Literature 1] Japanese Unexamined Patent Application Publication No. H09-158483.

SUMMARY OF INVENTION

Technical Problem

The concrete vibrator of Patent Literature 1 still has room for improvement from the perspective of user-friendliness.

In consideration of such situation, an objective of the invention is to provide a user-friendly handheld power tool.

Solution to Problem

An aspect of the invention is a power tool. The power tool includes a body part to which a battery pack is able to be attached and detached, a load part accommodated in the body part, and a cover the battery pack to be able to open and close, and has a correcting part able to correct a shape of the cover.

The correcting part may correct the shape of the cover by contacting the cover or the body part.

The cover may have an engagement part, and the body part may have an engaged part engaged with the engagement part.

An engagement structure of the engagement part and the engaged part may be a latch structure, and a direction in which an engagement force of the latch structure acts may be substantially a same direction as a direction in which a correcting force of the correcting part acts.

The correcting force may be a force acting in a direction pressing the cover outward.

The correcting part may correct inward deformation of the cover.

The cover may have the engagement part on each of a left side surface and a right side surface. The body part may have the engaged part engaged with the engagement part. An engagement structure of the engagement part and the engaged part may be a latch structure. An engagement force of the latch structure at a time of closing the cover may act to press the left side surface and the right side surface of the cover inward. A correcting force of the correcting part may press the left side surface and the right side surface of the cover outward.

An end of the correcting part may be in a rounded shape, or the correcting part may be an elastic body.

The correcting part may contact a battery pack mounted to the battery pack mount or an adapter mounted to the battery pack mount.

A movable part able to open and close may be provided at the cover. In an open state of the movable part, an opening part through which a cord extending from the adapter mounted to the battery pack mount extends out of the cover may be formed, or, in a mounted state of the movable part, the opening part through which the cord extending from the adapter mounted to the battery pack mount extends out of the cover may be formed.

The movable part may be provided on a surface of the cover different from a surface corrected by the correcting part.

Another aspect of the invention is a power tool. The power tool includes a body part having a battery pack mount to which a battery pack is able to be attached and detached, a load part accommodated in the body part, a battery pack mounted to the battery pack mount, and a cover able to cover the battery pack mounted to the battery pack mount and the battery pack mount to be able to open and close. A movable part that is able to open and close or be attached and detached is provided in the cover, and an opening part through which, in an open state or a mounted state of the movable part, a cord extending from an adapter mounted to the battery pack mount extends out of the cover is formed.

In a case where the battery pack is mounted to the battery pack mount, the movable part may be usable in a closed state.

An engagement part of the cord with at least one of the movable part and the cover may form a spigot structure.

The body part may have a handle part extending upward from the battery pack mount. In the open state of the movable part, an upper end of the movable part may be located at a same height as or lower than a lower end of the handle part.

An aspect of the invention is a power tool. The power tool includes a load part; an operation part, operated by an operator to switch an operation of the load part; a housing, accommodating the load part; and a cover, covering the operation part.

The cover may be configured to be able to open and close with respect to the housing by a latch mechanism locking the cover in the closed state with respect to the housing.

The latch mechanism may be provided on each of a left side and a right side of the cover.

The housing may be configured to include a battery pack mount to which a battery pack serving as a driving source of the load part is able to be attached and detached. The cover may be configured to cover the battery pack mount.

The operation part may be provided on a surface of the battery pack mount, the surface being spaced apart from the battery pack by a gap and facing the battery pack.

A seal member for preventing a foreign matter from entering the cover may be provided between the cover and the housing.

The load part may be a brushless motor, and have a stator, a rotor rotatable on an inner side to the stator, and a coil provided at the stator. The handheld power tool may include a control part controlling rotation of the brushless motor. A rotation speed of the brushless motor may be switchable by an operation of the operation part.

In a case where a load applied to the brushless motor is in a predetermined range, the control part may perform constant speed control maintaining a rotation speed of the brushless motor regardless of the load.

The power tool may be a concrete vibrator having a tip tool inserted into fresh concrete and vibrated by the load part.

Another aspect of the invention is a concrete vibrator including a brushless motor, and a tip tool inserted into fresh concrete and vibrated by the brushless motor.

The concrete vibrator may include a control part controlling rotation of the brushless motor. In a case where a load applied to the brushless motor is in a predetermined range, the control part may perform constant speed control maintaining a rotation speed of the brushless motor regardless of the load.

The control part may be able to change a rotation speed of the brushless motor in accordance with an external operation.

The concrete vibrator may include a trigger switch with which the operator is able to instruct to drive or stop the brushless motor, and may be able to change a rotation speed of the brushless motor in accordance with an operation amount of the trigger switch.

Another aspect of the invention is a concrete vibrator. The concrete vibrator includes a load part; an operation part, operated by an operator to switch an operation of the load part; and a tip tool inserted into fresh concrete and vibrated by the load part.

The load part is a brushless motor and includes a control part controlling rotation of the brushless motor. In a case where a load applied to the brushless motor is in a predetermined range, the control part may perform constant speed control maintaining a rotation speed of the brushless motor regardless of the load.

It should be noted that any combination of the above components and conversion of the expression of the invention between methods, systems and the like are also effective as aspects of the invention.

Effects of Invention

According to the invention, a user-friendly handheld power tool can be provided.

DESCRIPTION OF EMBODIMENTS

Figure 1:
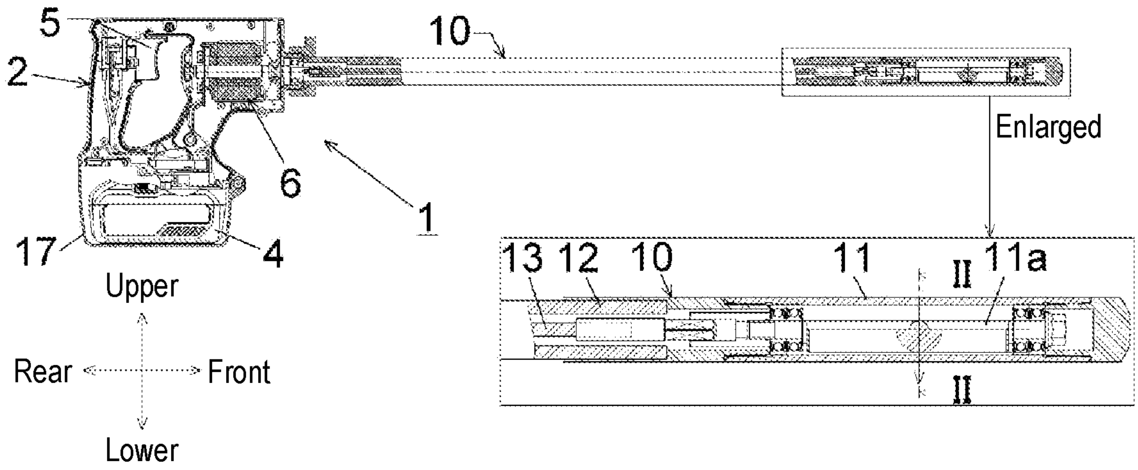
FIG. 1 is a side cross-sectional view of a power tool according to Embodiment 1 of the invention.
Figure 2:
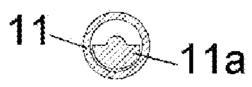
FIG. 2 is a cross-sectional view taken along II-II of FIG. 1.

In the following, the same or equivalent components, members, etc., shown in the drawings are labeled by the same reference numerals, and repeated description thereof will be omitted as appropriate. The embodiments do not serve as limitations to the invention, but merely serve as examples. Not all features and combinations thereof described in the embodiments are essential to the invention.

Figure 3:
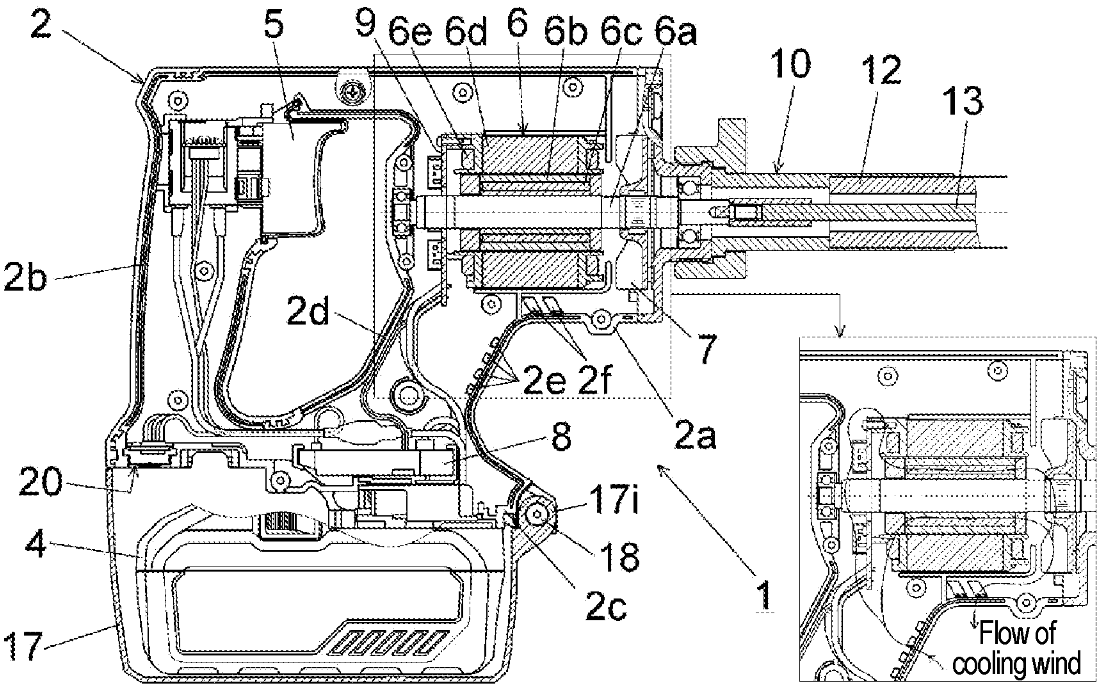
FIG. 3 is a partial enlarged view of FIG. 1.
Figure 4:
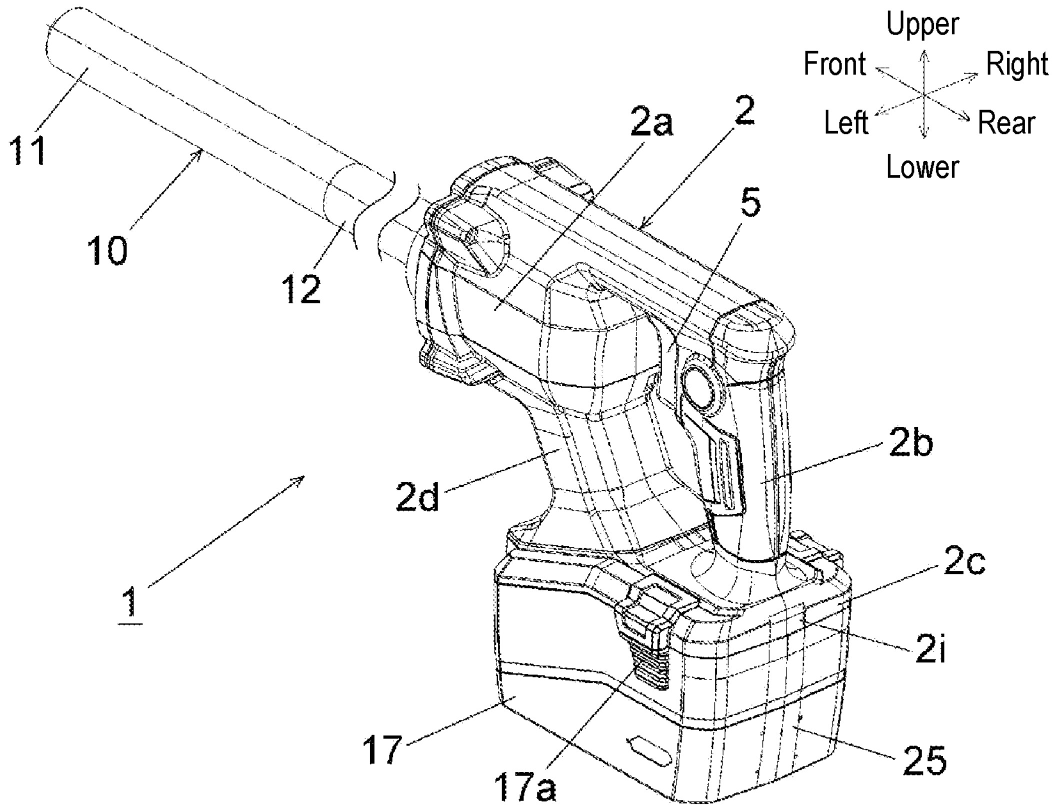
FIG. 4 is a top perspective view of the power tool 1.
Figure 5:
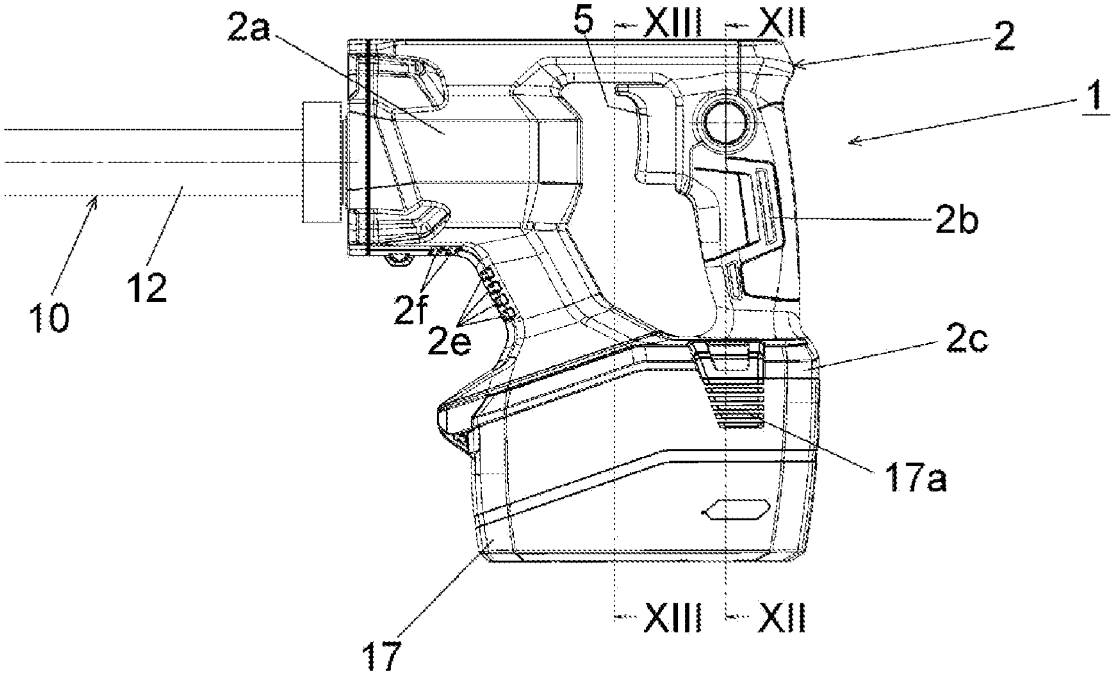
FIG. 5 is a side view of the same.
Figure 6:
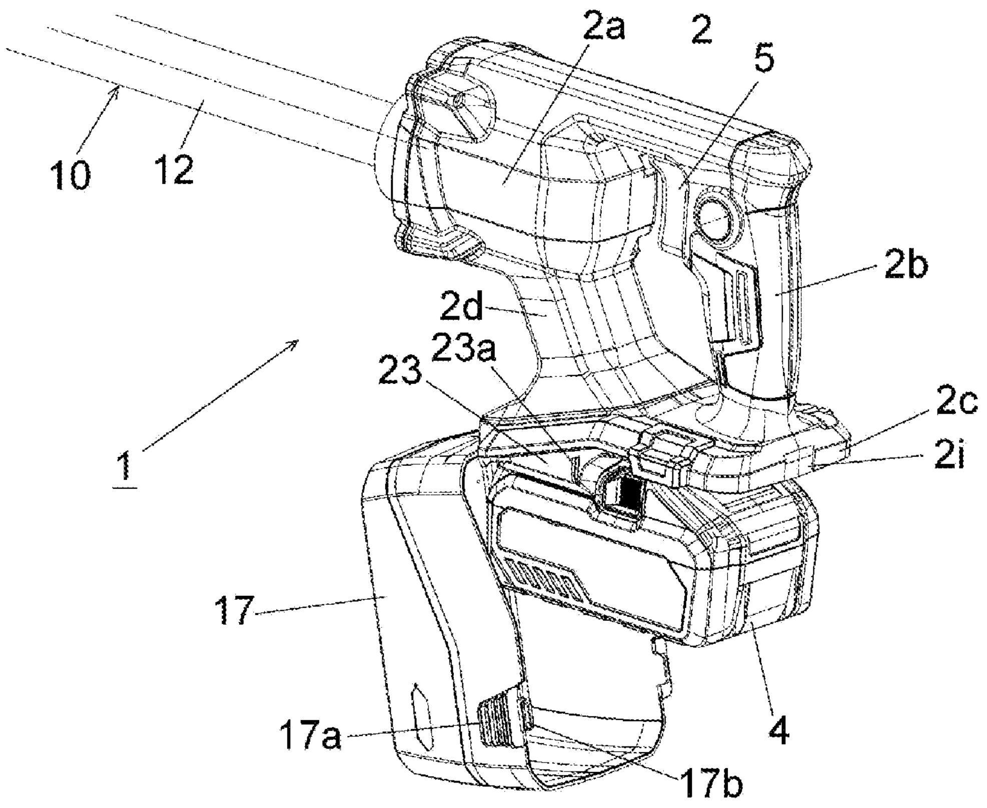
FIG. 6 is a top perspective view of the power tool 1 in which a cover 17 is opened from the state of FIG. 4.
Figure 7:
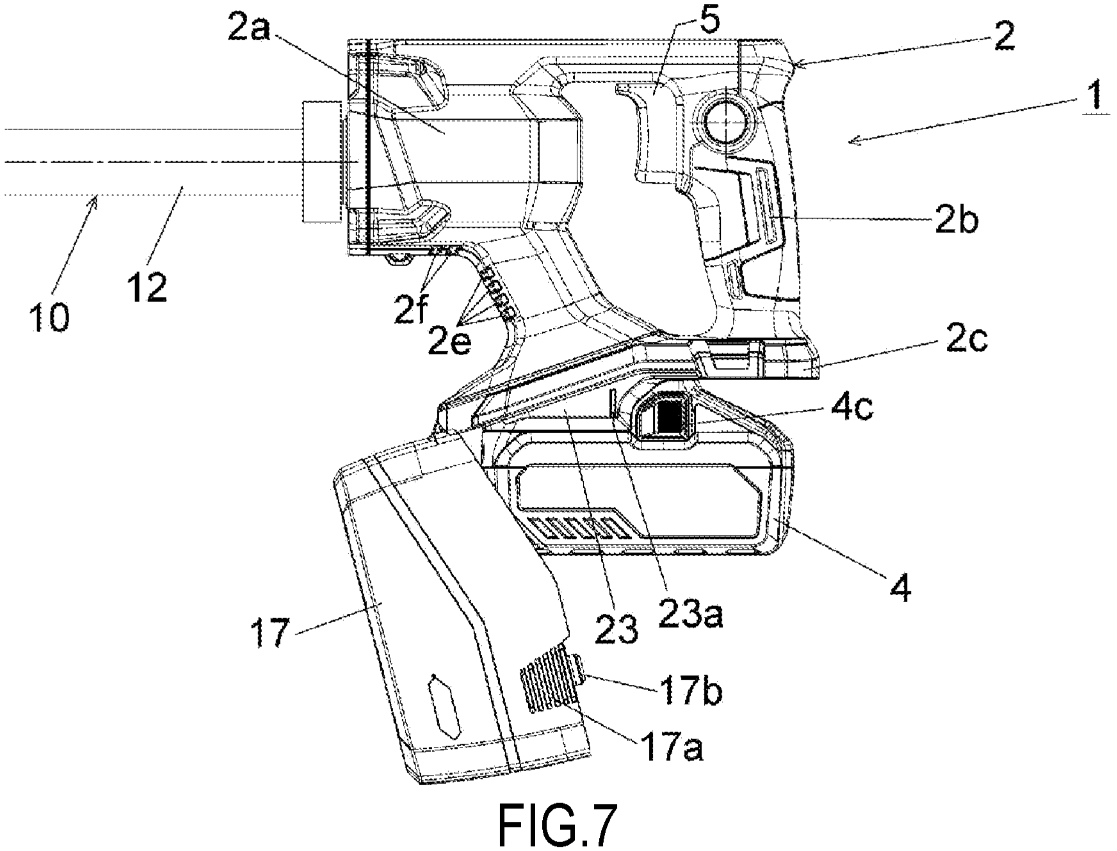
FIG. 7 is a side view of the same.
Figure 8:
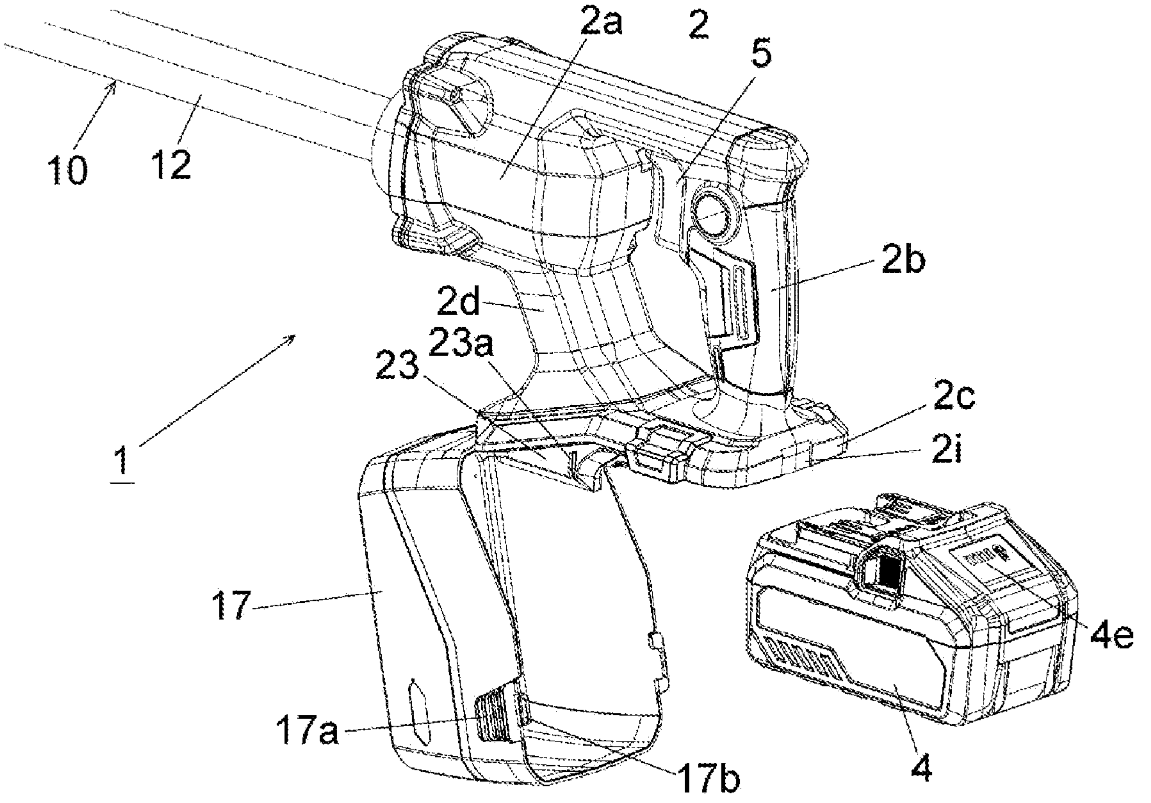
FIG. 8 is a top perspective view of the power tool 1 in which a battery pack 4 is separated from the state of FIG. 6.
Figure 9:
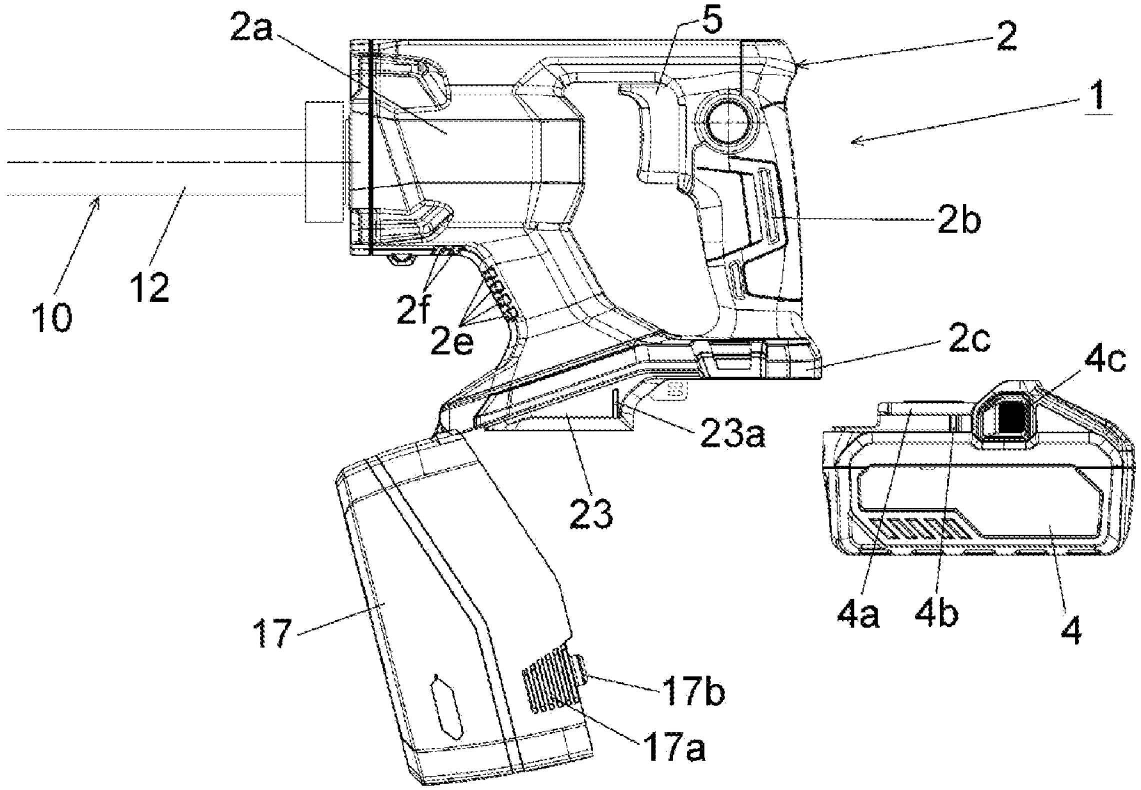
FIG. 9 is a side view of the same.

(Embodiment 1) Embodiment 1 of the invention will be described with reference to FIGS. 1 to 25. The embodiment relates to a power tool 1. The power tool 1 is a concrete vibrator. As shown in FIGS. 1 and 4, the front-rear direction, the upper-lower direction, and the left-right direction respectively orthogonal to each other are defined for the power tool 1. The front-rear direction is an extending direction of a rotation shaft 6*a* of a motor 6 shown in FIG. 3. The left-right direction is defined based on the case of looking at the front direction. The outer case of the body of the power tool 1 is formed by a housing 2. The housing 2 is, for example, a resin molded article in a left-right split structure, for example.

The housing 2 includes a motor accommodation part 2*a*, a holding part (handle part) 2*b*, a battery pack mount 2*c*, and a connection part 2*d*. The housing 2 is in a substantial D shape. The holding part 2*b* is in a substantial L shape and extends in the front-rear direction and the upper-lower direction. In the holding part 2*b*, a portion extending in the upper-lower direction is held by an operator. An end (front end) of the holding part 2*b* is connected to the motor accommodation part 2*a*. Another end (lower end) of the holding part 2*b* is connected to the battery pack mount 2*c*. An end (upper end) of the connection part 2*d* is connected to the motor accommodation part 2*a*. Another end (lower end) of the connection part 2*d* is connected to the battery pack mount 2*c*.

The motor accommodation part 2*a* accommodates the motor (electric motor) 6. A trigger switch 5 is provided at the holding part 2*b*. With the trigger switch 5, it is possible for the operator to instruct the motor 6 to drive or stop. On the front surface of the connection part 2*d*, multiple intake ports 2*e* are provided. On the lower surface of the motor accommodation part 2*a*, multiple exhaust ports 2*f* are provided. As shown in FIG. 3, a control substrate 8 is provided inside near the boundary between the lower end of the connection part 2*d* and the battery pack mount 2*c*. A battery pack 4 serving as the driving source (power source) of the motor 6 is detachably mounted to (in slide connection with) the battery pack mount 2*c*. The battery pack 4 may be able to be attached to and detached from the power tool.

Figure 11:
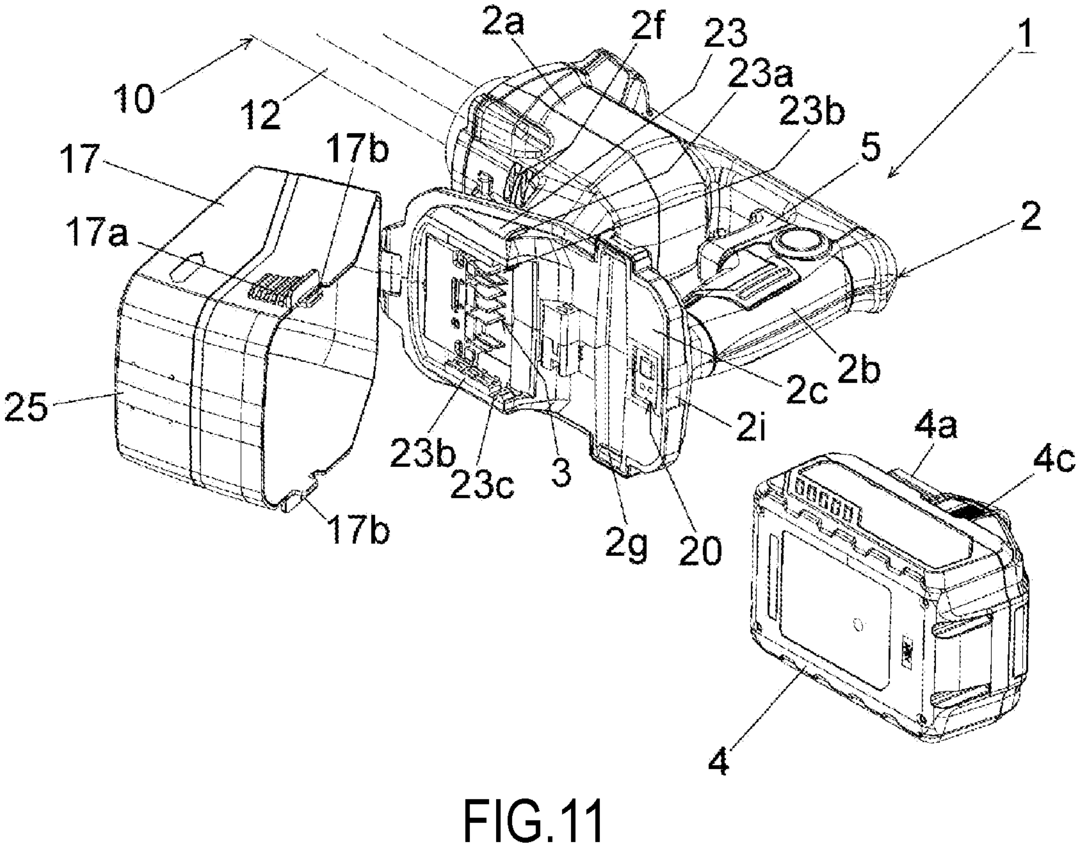
FIG. 11 is a lower perspective view of the power tool 1 of the state of FIG. 8.

As shown in FIG. 11, terminals 3 electrically connected with terminals of the battery pack 4 and rail parts 23*b* guiding to mount the battery pack 4 are provided in the battery pack mount 2*c*. On the lower surface of the battery pack mount 2*c*, a U-shaped wall part 23 is provided to cross the left, the front, and the right of the lower surface. The wall part 23 extends downward from the lower surface of the battery pack mount 2*c*. The rail parts 23*b* protruding inwardly are respectively provided on the inner surfaces (opposite, facing surfaces) on the left and the right of the wall part 2*b*. Correcting parts 23*a* are respectively provided on the outer surfaces on the left and the right of the wall part 23. The correcting part 23*a* is a guide (rib) extending in the upper-lower direction. The lower surface of the battery pack mount 2*c* and the battery pack 4 mounted to the battery pack mount 2*c* are covered by a cover 17 able to open and close. Details of the cover 17 will be described afterwards.

Figure 10:
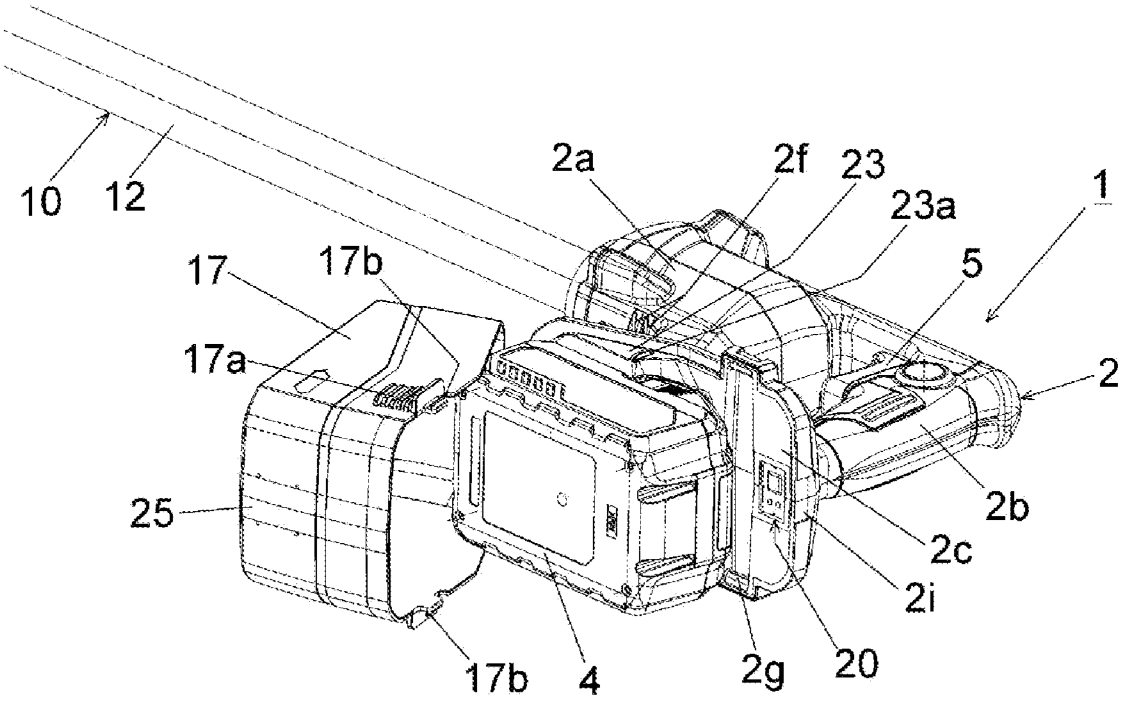
FIG. 10 is a lower perspective view of the power tool 1 of the state of FIG. 6.
Figure 14:
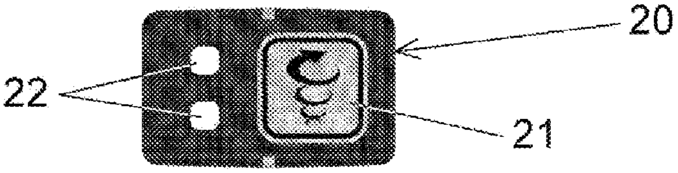
FIG. 14 is an appearance view of an operation panel 20 shown in FIGS. 10 and 11.

As shown in FIGS. 10 and 11, an operation panel 20 is provided in the vicinity of the rear end of the lower surface of the battery pack mount 2*c*. The operation panel 20 is also covered by the cover 17. The operation panel 20 is at a location adjacent to the battery pack 4 in the front rear direction. The operation panel 20 is thus spaced apart from the battery pack 4 by a gap and faces the rear end upper surface of the battery pack 4. Through the gap, it is possible for the operator to operate the operation panel 20. Therefore, the operation panel 20 is positioned so as to be operable by an operator through the gap when the battery pack 4 is mounted to the battery pack mount 2*c* and the cover 17 is opened, and not to be operable by an operator when the cover 17 is closed. The rear end upper surface of the battery pack 4 is inclined downward toward the rear. The gap is formed between the inclined surface of the battery pack 4 and the operation panel 20. Therefore, even in the state where the battery pack 4 is mounted, it is easy to see the operation panel 20 from the obliquely lower side of the rear and it is also easy to operate the operation panel 20. As shown in FIG. 14, a speed (frequency) switch button 21 and a speed (frequency) display LED 22 are provided on the operation panel 20. The speed switch button 21 is an operation part for the operator to switch the number of rotations in the constant speed control, that is, the vibration frequency of the tip tool 10, of the motor 6. The number of rotations per unit time, that is, the speed of the rotation, is simply represented as "rotation speed". The speed display LED 22 is a speed display part displaying (notifying the operator) the rotation speed selected by using the speed switch button 21. By using the speed switch button 21, it is possible to switch between whether to execute the constant speed control on the motor.

As shown in FIG. 3, the motor 6, as a load part, is an inner rotor type brushless motor. In the motor 6, a rotor core 6*b* formed of a magnetic substance and integrally rotating with the rotation shaft 6*a* is provided around the rotation shaft 6*a*. Rotor magnets (permanent magnets) 6*c* are inserted into and held on the rotor core 6*b*. Multiple (e.g., 4) rotor magnets 6*c* are provided at equal intervals (e.g., every 90 degrees) along the shaft circumference direction. A stator core 6*d* (fixed to the motor accommodation part 2*a*) is provided around the rotor core 6*b*. A stator coil 6*e* is provided at the stator core 6*d*. A switching element substrate 9 is provided in rear of the stator core 6*d*. A switching element of an inverter circuit supplying a driving current to the motor 6 is mounted on the switching element substrate 9. In front of the stator core 6*d*, a fan 7 is mounted to the rotation shaft 6*a*. The fan 7 integrally rotates with the rotation shaft 6*a*, and generates a cooling wind for cooling off the motor 6. The cooling wind enters the housing 2 from the intake ports 2*e*, cools off the motor 6, and exits the housing 2 from the exhaust ports 2*f*. The flow of the cooling wind generated by the fan 7 is as shown in FIG. 3.

The tip tool 10 extends forward from the tip of the housing 2. The tip tool 10 includes a vibration part 11, a flexible hose 12, and a flexible shaft 13. The flexible shaft 13 is directly connected to the rotation shaft 6*a* of the motor 6, and integrally rotates with the motor 6. The flexible hose 12 covers the periphery of the flexible shaft 13. The vibration part 11 is connected to the tip part of the flexible hose 12. An eccentric weight 11*a* is provided inside the vibration part 11. The eccentric weight 11*a* is driven and rotated by the motor 6 via the flexible shaft 13. The gravity center of the eccentric weight 11*a* is eccentric with respect to the central axis of the vibration part 11. The vibration part 11 is vibrated through the rotation of the eccentric weight 11*a*. That is, the vibration part 11 is vibrated by the motor 6. The operator inserts the vibration part 11 that vibrates into fresh concrete to implement driving work or compaction work.

As shown in FIG. 3, the cover 17 is connected to the housing 2 through a connection part 17*i* and a shaft part 18 forming a hinge mechanism at the front end of the battery pack mount 2*c*. With the support of the shaft part 18, the cover 17 is able to open or close with respect to the housing 2. With the cover 17 and the battery pack mount 2*c*, the battery pack 4 is entirely covered. On the outer surface of the battery pack mount 2*c*, a seal member (not shown), such as an elastomer, is integrally provided. When the cover 17 is closed, the seal member is pressed to the upper end of the cover 17. Accordingly, the gap at the boundary between the battery pack mount 2*c* and the cover 17 is filled, and a foreign matter is prevented from entering the cover 17 from the gap. Similarly, when the seal member is provided on the upper surface of the cover 17, the gap at the boundary between the battery pack mount 2*c* and the cover 17 is filled, and a foreign matter can be prevented from entering the cover 17 from the gap.

Figure 12:
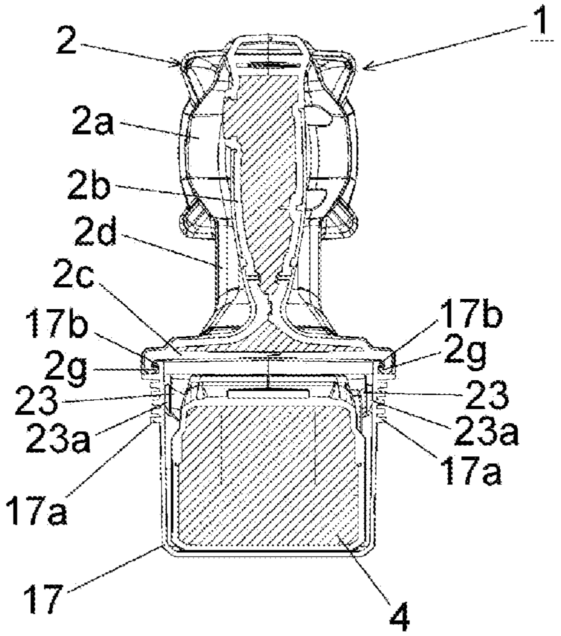
FIG. 12 is a cross-sectional view taken along XII-XII of FIG. 5.

The cover 17 has a latch operation part 17*a* and a latch claw part 17*b* on each of the rear parts of the left side surface and the right side surface. The latch operation part 17*a* and the latch claw part 17*b* form a latch mechanism which locks the cover 17 in the closed state with respect to the housing 2. As shown in FIGS. 10 to 12, the latch mechanism is provided on each of the left side and the right side of the rear end side of the cover 17. The battery pack mount 2*c* has a claw part 2*g* on each of the left side and the right side. The claw part 2*g* is engaged with the latch claw part 17*b*. Through the engagement between the latch law part 17*b* and the claw part 2*g*, the cover 17 is locked in the closed state with respect to the housing 2. By pressing the latch operation parts 17*a* inward, the operator can remove the engagement between the latch claw parts 17*b* and the claw parts 2*g* and open the cover 17.

The cover 17 is a resin molded article in a box (substantially rectangular parallelepiped) shape, for example. The portions of the cover 17, except for the movable part 25 to be described afterwards, may be formed as a single molded article. When the cover 17 is molded, there is inward warping (deformation) on the side surfaces of the cover 17. Among the four side surfaces, the side surfaces in the longitudinal direction, that is, the side surfaces on which the latch operation parts 17*a* and the latch claw parts 17*b* are provided, have a larger warping amount than the side surfaces in the traverse direction. Due to the warping amount, the latch claw parts 17*b* of the cover 17 are not engaged with the claw parts 2*g* of the battery pack mount 2*c*, and the cover 17 cannot be locked in the closed state. As shown in FIGS. 10 to 13, the correcting parts 23*a* provided at the battery pack mount 2*c* are provided to correct (suppress) the inward warping of the left side surface and the right side surface of the cover 17.

Figure 13:
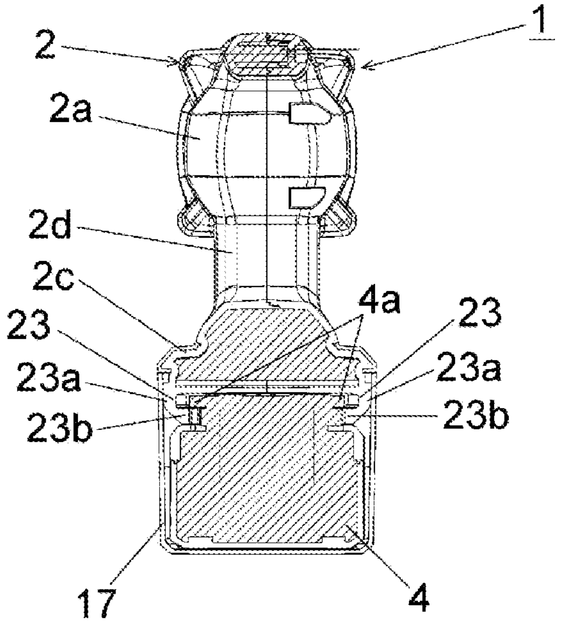
FIG. 13 is a cross-sectional view taken along XIII-XIII of FIG. 5.

The correcting part 23*a* is located slightly forward of the center of the cover 17 in the front-rear direction. During the process of closing the cover 17 and in the state where the cover 17 is closed, the correcting parts 23*a* contact the upper ends of the left side surface and the right side surface of the cover 17 to press the left side surface and the right side surface of the cover 17 outward respectively. The direction in which the correcting force of the correcting part 23*a* acts and the direction in which the engagement force between the latch claw part 17*b* of the cover 17 and the claw part 2*g* of the battery pack mount 2*c* acts are substantially the same direction, and are both the left-right direction. The engagement force between the latch claw part 17*b* and the claw part 2*g* that is applied when the cover 17 is closed acts to press inward the left side surface and the right side surface of the cover 17. Meanwhile, the correcting forces of the correcting parts 23*a* act to press outward the left side surface and the right side surface of the cover 17. As shown in FIG. 13, the lower end of the correcting part 23*a* has a rounded shape. Accordingly, in the process of closing the cover 17, the left side surface and the right side surface smoothly ride on the correcting parts 23*a*, and breakage or damage is suppressed. Also, in order to suppress the breakage or damage of the cover 17, the correcting parts 23*a* may also be configured to contact the cover 17 only when the cover 17 exhibits inward warping.

The correcting parts 23*a* serve to realize, in a balanced manner, the reduction of the operation load to the latch operation parts 17*a* required for removing the engagement between the latch claw parts 17*b* and the claw parts 2*g*, as well as the stability of the latch engagement. In the following, details will be described. When the latch mechanism is provided on the back surface (side surface in the traverse direction) of the cover 17, since the width of the back surface of the cover 17 is short, the operation load (represented as "required operation load" in the following) required to remove the engagement of the latch mechanism is greater, making it less user-friendly. Comparatively, when the latch mechanism is provided on the left side surface and the right side surface (side surfaces in the longitudinal direction), although the required operation load can be reduced, the risk that the cover 17 is opened unintentionally due to vibration, etc., at the time of working is higher. The correcting parts 23*a* reduce the required operation load is reduced as compared to the case where the latch mechanism is provided on the back surface of the cover 17, and lower the risk that the cover 17 is opened unintentionally as compared with the case without the correcting parts 23*a*. The more forward the correcting parts 23*a* are provided on the front side with respect to the latch mechanisms, the smaller the required operation load, and the more rearward the correcting parts 23*a* are provided, the lower the risk that the cover 17 is opened unintentionally.

Figure 18:
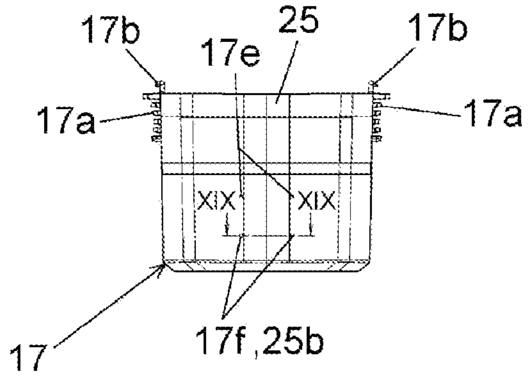
FIG. 18 is a back view of the cover 17 in a state in which the movable part 25 is closed.
Figure 20:
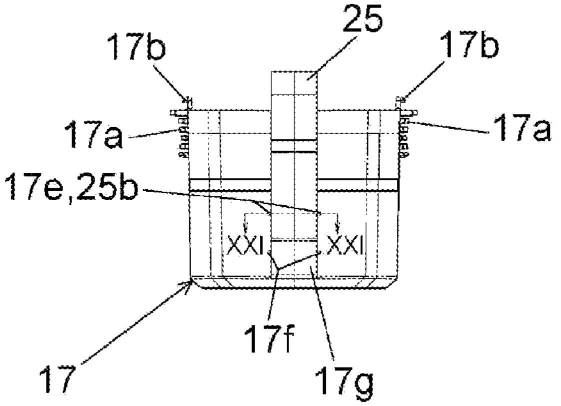
FIG. 20 is a back view of the cover 17 in a state in which the movable part 25 is opened.
Figure 25:
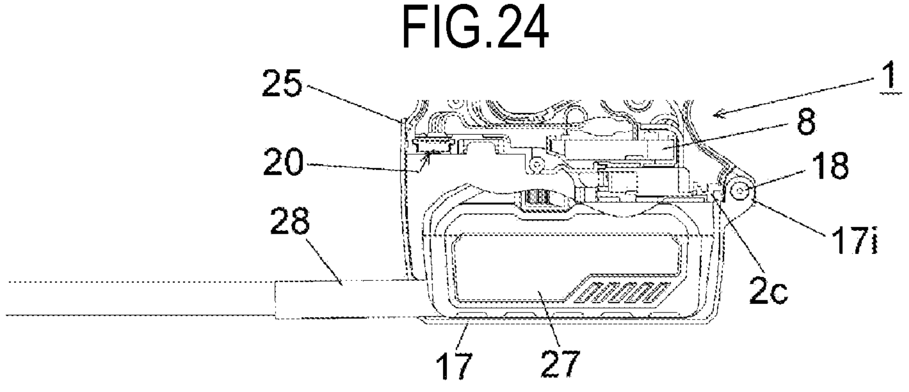
FIG. 25 is a side cross-sectional view of the same.

As shown in FIG. 25, an adapter 27 can be mounted to the battery pack mount 2*c*. The adapter 27 has a case shape and a terminal structure like the battery pack 4, but does not have battery cells accommodated in the adapter 27. A cord 28 for connection with an external DC power supply device not shown herein extends from the rear lower end of the adapter 27. The DC power output by the DC power supply device is supplied to the power tool 1 via the cord 28 and the adapter 27. In the case where the adapter 27 is mounted to the battery pack mount 2*c*, when the cover 17 can only entirely cover the adapter 27, there is an issue that the cord 28 cannot be pulled. Therefore, in the embodiment, a portion of the cover 17 is configured as the movable part 25 able to close and open. FIG. 18 shows the closed state of the movable part 25, and FIG. 20 shows the open state of the movable part 25. The movable part 25 is a plate body formed by a resin molded article in a substantially rectangular shape, for example.

Figure 15:
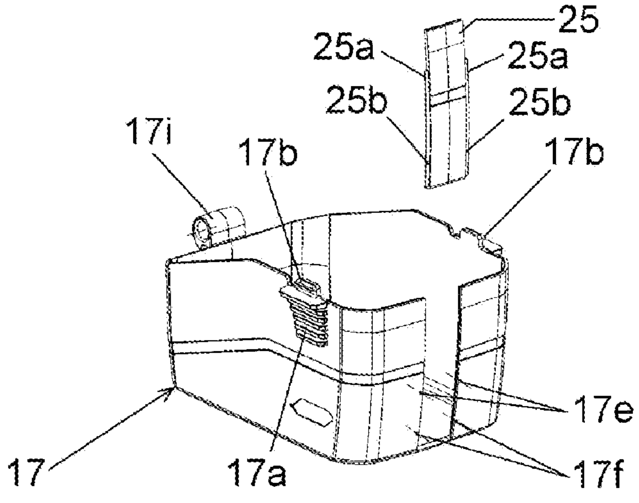
FIG. 15 is a perspective view of the cover 17 in a state in which a movable part 25 is separated.
Figure 17:
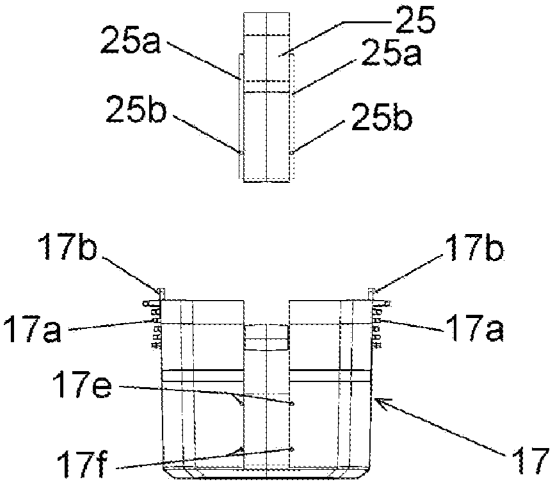
FIG. 17 is a back view of the same.
Figure 19:
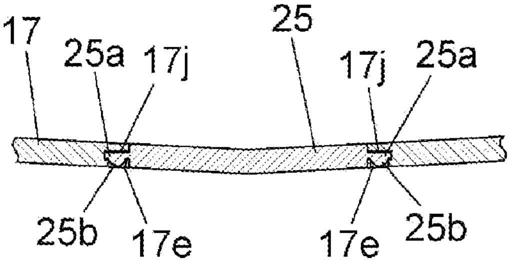
FIG. 19 is a cross-sectional view taken along XIX-XIX of FIG. 18.
Figure 21:
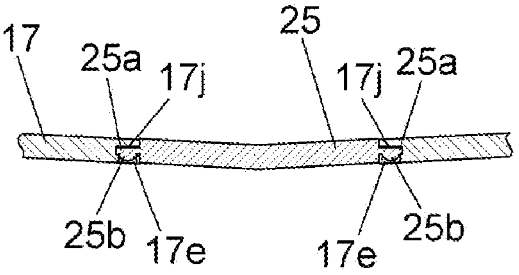
FIG. 21 is a cross-sectional view taken along XXI-XXI of FIG. 20.
Figure 22:
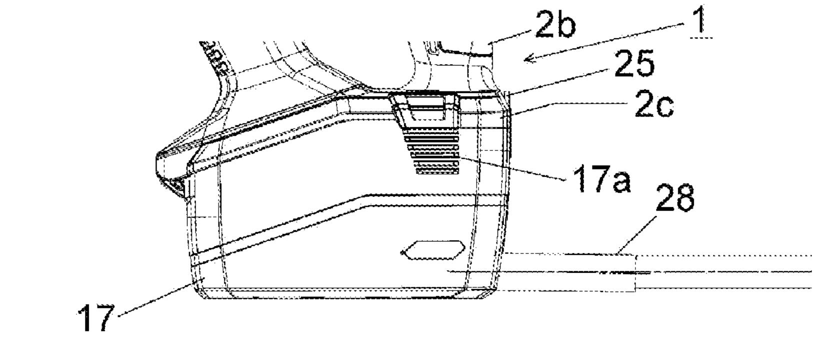
FIG. 22 is a side view of main components of the power tool 1 in a state in which an adapter 27 is mounted to a battery pack mount 2*c*.

As shown in FIGS. 15 and 17, the movable part 25 has rail parts 25*a* respectively at the left end and the right end. At the intermediate part of each of the rail parts 25*a* on the left and the right, a locking protrusion part 25*b* protruding rearward is provided. As shown in FIGS. 19 and 21, the cover 17 has grooves 17*j* engaged with the rail parts 25*a*. At the intermediate parts of the grooves 17*j*, hole parts (locking parts) 17*e* and 17*f* engaged with the locking protrusion parts 25*b* are provided.

As shown in FIGS. 18 and 19, the state in which the locking protrusion parts 25*b* of the movable part 25 are engaged with the hole parts 17*f* on the lower side of the cover 17 to lock the movable part 25 is the closed state of the movable part 25. In the case where the battery pack 4 is mounted to the battery pack mount 2*c*, the movable part 25 may be used in the closed state. As shown in FIGS. 20 and 21, the state in which the locking protrusion parts 25*b* of the movable part 25 are engaged with the hole parts 17*e* on the upper side of the cover 17 to lock the movable part 25 is the opened state of the movable part 25. In the case where the adapter 27 is mounted to the battery pack mount 2*c*, the movable part 25 is used in the open state.

Figure 16:
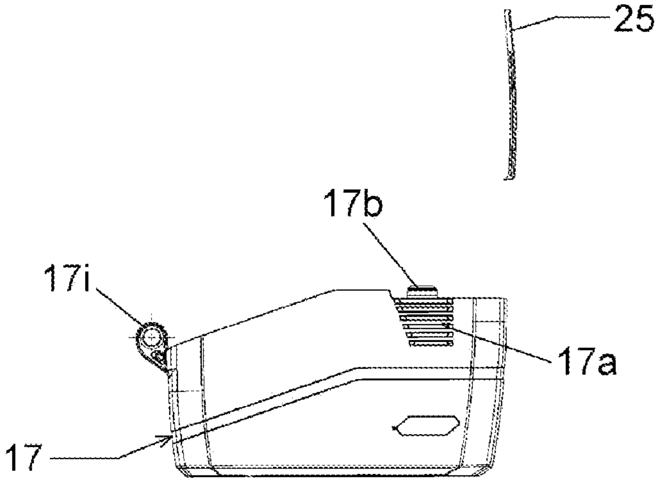
FIG. 16 is a side view of the same.
Figure 23:
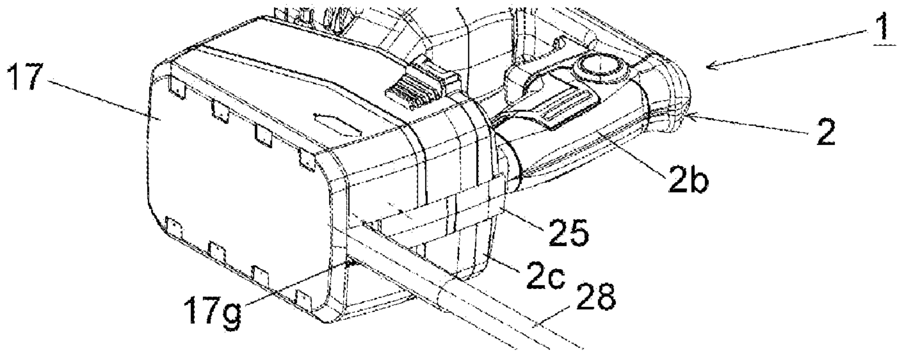
FIG. 23 is a lower perspective view of the same.
Figure 24:
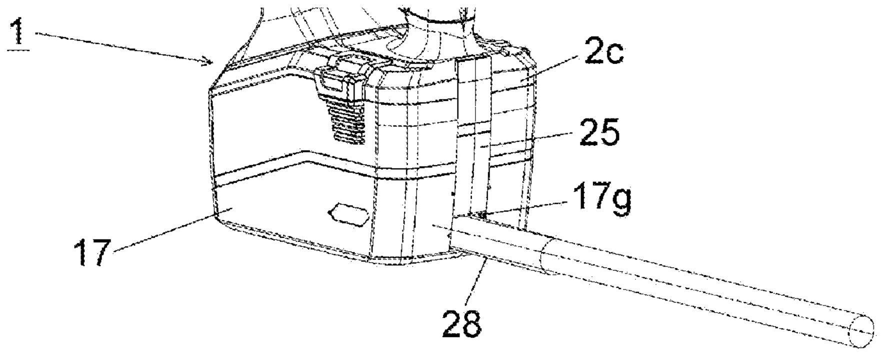
FIG. 24 is a top perspective view of the same.

As shown in FIGS. 20, 23, and 24, in the open state of the movable part 25, an opening part 17*g* is provided at the center of the back surface lower end of the cover 17. The opening part 17*g* serves as an exit for pulling the cord 28 outside the cover 17. A groove part (recess part) 2*i* of the battery pack mount 2*c* as shown in FIG. 4, etc., is a space where the upper end of the movable part 25 in the open state is located, and is a space where the movable part 25 passes through when the movable part 25 is detached. The movable part 25 can be separated (removed) from the cover 17 as shown in FIGS. 15 to 17. In the open state of the movable part 25, the upper end of the movable part 25 is located at the same height as or lower than the lower end of the handle part 2*b*. Accordingly, the movable part 25 in the open state can be suppressed from hitting the operator's hand holding the handle part 2*b* and deteriorating the user-friendliness.

The procedure of mounting the adapter 27 to the battery pack mount 2*c* until the cover 17 is closed is described in the following. The movable part 25 is separated from the cover 17. The adapter 27 is mounted to the battery pack mount 2*c*. The cover 17 is closed so that the cord 28 passes through the gap of the back surface of the cover 17 (the portion where the movable part 25 is present). The movable part 25 slides from the top to be mounted on the back surface of the cover 17. Accordingly, the state shown in FIGS. 22 to 25 is achieved.

Figure 26:
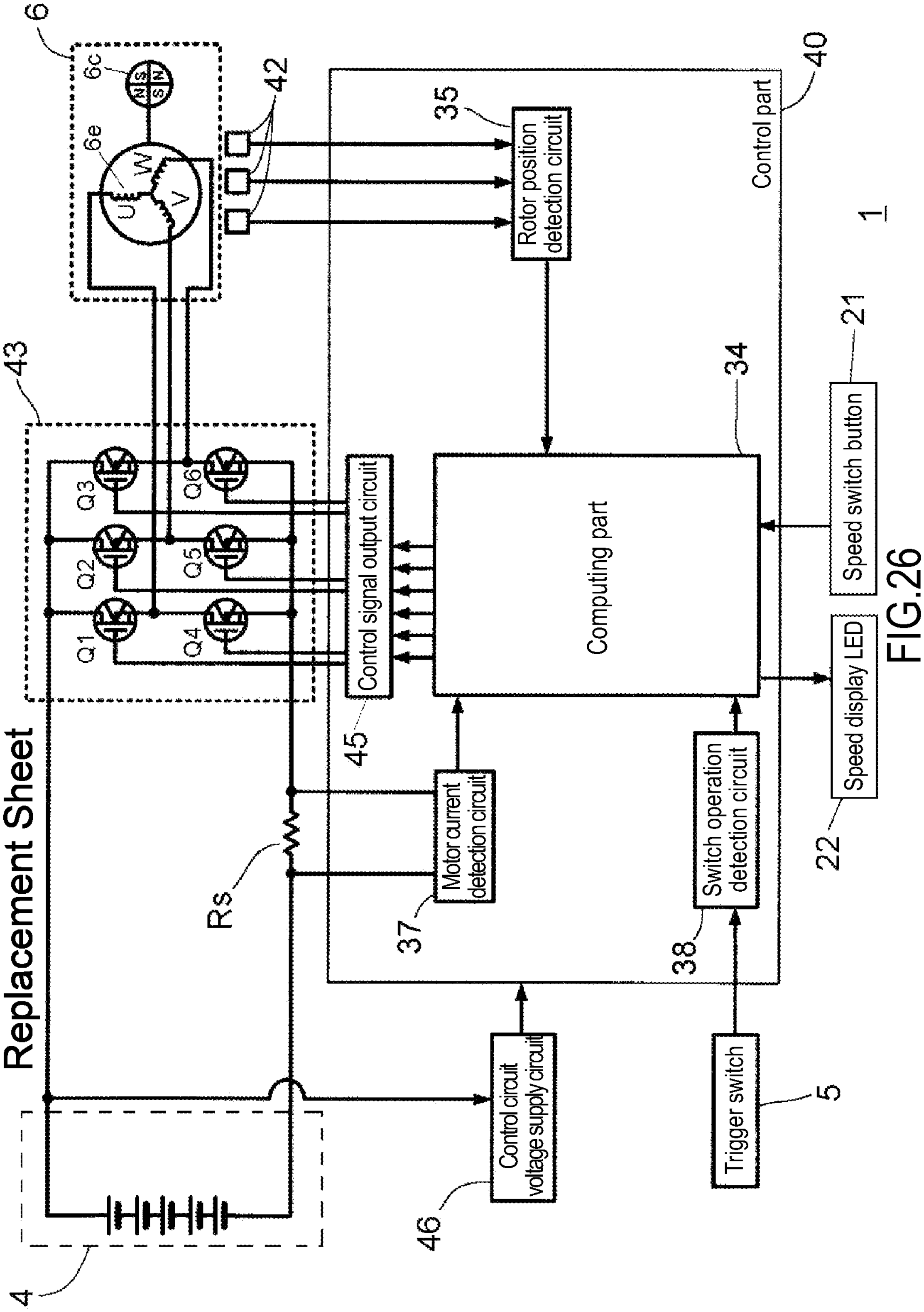
FIG. 26 is a block diagram of the power tool 1.

FIG. 26 is a block diagram of a power tool 1. A control part 40 is mounted on the control substrate 8 shown in FIG. 3. The control part 40 performs various control, such as the driving control of an inverter circuit 43. The inverter circuit 43 includes switching elements Q1 to Q6, such as IGBT, FET, etc., connected by a three-phase bridge. The switching elements Q1 to Q6 perform a switching operation according to the control of the control part 40, and supply a driving current to the stator coil 6*e* (respective windings of U, V, and W) of the motor 6. A resistor Rs is provided on the path of the current (represented as "motor current" in the following) of the motor 6. The control circuit voltage supply circuit 46 converts the voltage of the battery pack 4 to a voltage suitable for the operation of the control part 40 and supplies the converted voltage to the control part 40. A magnetic sensor 42, for example, is a Hall element or a Hall IC. The magnetic sensor 42 outputs a signal in accordance with the rotation position (rotor rotation position) of the motor 6.

In the control part 40, a motor current detection circuit 37 detects the driving current (load) of the motor 6 according to the voltages at the two ends of the detection resistor Rs, and transmits the detected driving current to a computing part 34. A switch operation detection circuit 38 detects the operation of the trigger switch 5 by the user, and transmits the detected operation to the computing part 34. A rotor position detection circuit 35 detects the rotation position of the motor 6 based on the signal from the magnetic sensor 42, and transmits the detected rotation position of the motor 6 to the computing part 34. The computing part 34 includes a microcontroller, etc. The computing part 34 drives a control signal output circuit 45 in accordance with the rotation position of the motor 6 detected by the rotor position detection circuit 35, and performs switching control (e.g., PWM control) on the switching elements Q1 to Q6 of the inverter circuit 43. The computing part 34 computes the rotation speed of the motor 6 based on the detection result of the rotor position detection circuit 35.

The computing part 34 has a soft start control function, a constant speed control function, a brake control function, and an overcurrent protection function (overload protection function). The soft start control refers to the control, at the time when the motor 6 is started, that gradually increases the rotation speed of the motor 6 toward a target rotation speed (set rotation speed) through duty control. The constant speed control refers to control that maintains the rotation speed of the motor 6 at the set rotation speed through duty control, regardless of the load applied to the motor 6. Even in the constant speed control, in the case where the load increases and the duty ratio of the PWM control of the motor 6 reaches the maximum value, when the load further increases, the rotation speed of the motor 6 drops. The brake control refers to the control that, when the trigger switch 5 is turned off, an electric brake is applied to the motor 6 to decelerate or stop the motor 6. In the brake control, for example, the switching elements Q1 to Q3 on the upper arm side are kept off while the switching elements Q4 to Q6 on the lower arm side are continuously turned on. The overcurrent protection function is a function which stops the power supply to the stator coil 6*e* when the motor current exceeds an overcurrent protection threshold (represented as "overcurrent threshold" in the following).

Figure 27:
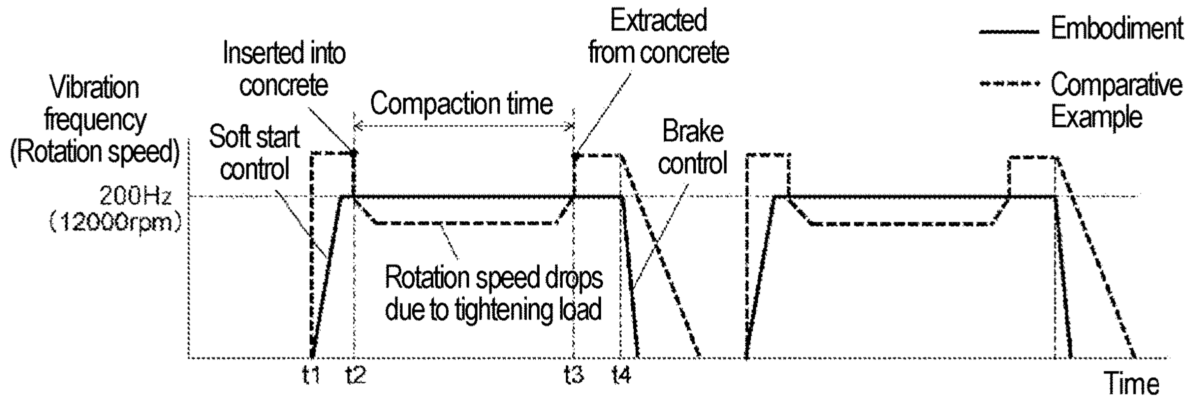
FIG. 27 is a time chart illustrating an example of the operation of the power tool 1 in compaction work.

FIG. 27 is a time chart illustrating an example of the operation of the power tool 1 in compaction work. In the figure, as a comparative example, the operation of a power tool without the soft start control function, the constant speed control function, and the brake control function is also shown. First of all, the operation of the embodiment (solid line) is described. When the operator turns on the trigger switch 5 at a time t1, the computing part 34 gradually increases the rotation speed of the motor 6 toward 200 Hz, which is the target rotation speed, by gradually increasing the duty ratio through the soft start control. At a time t2 after the rotation speed of the motor 6 reaches the target rotation speed, the operator inserts the vibration part 11 of the tip tool 10 into fresh concrete. Then, although a tightening load is applied to the motor 6, the rotation speed of the motor 6 is maintained at the target rotation speed by controlling the duty ratio through the constant speed control. At a time t3, the operator extracts the vibration part 11 from the fresh concrete. Then, although there is no tightening load, the rotation speed of the motor 6 is maintained at the target rotation speed through the constant speed control. At a time t4, when the operator turns off the trigger switch 5, the computing part 34 decelerates and stops the rotation of the motor 6 through the brake control.

In the comparative example (broken line) shown together in FIG. 27, since there is no soft start control function, the duty ratio is controlled to be set at 100% from the time t1 when the trigger switch 5 is turned on, and the rotation speed of the motor 6 increases drastically. Since there is no constant speed control function, the rotation speed of the motor 6 is unnecessarily high in the state without load before the time t2. At the time t2, when the vibration part 11 is inserted into the fresh concrete, the rotation speed of the motor 6 drops due to a tightening load. At the time t3, when the vibration part 11 is extracted from the fresh concrete, the rotation speed of the motor 6 increases as the tightening load disappears. Since there is no brake control function, it takes a long time from the time t4 at which the trigger switch 5 is turned off to the time when the motor 6 is stopped.

Figure 28:
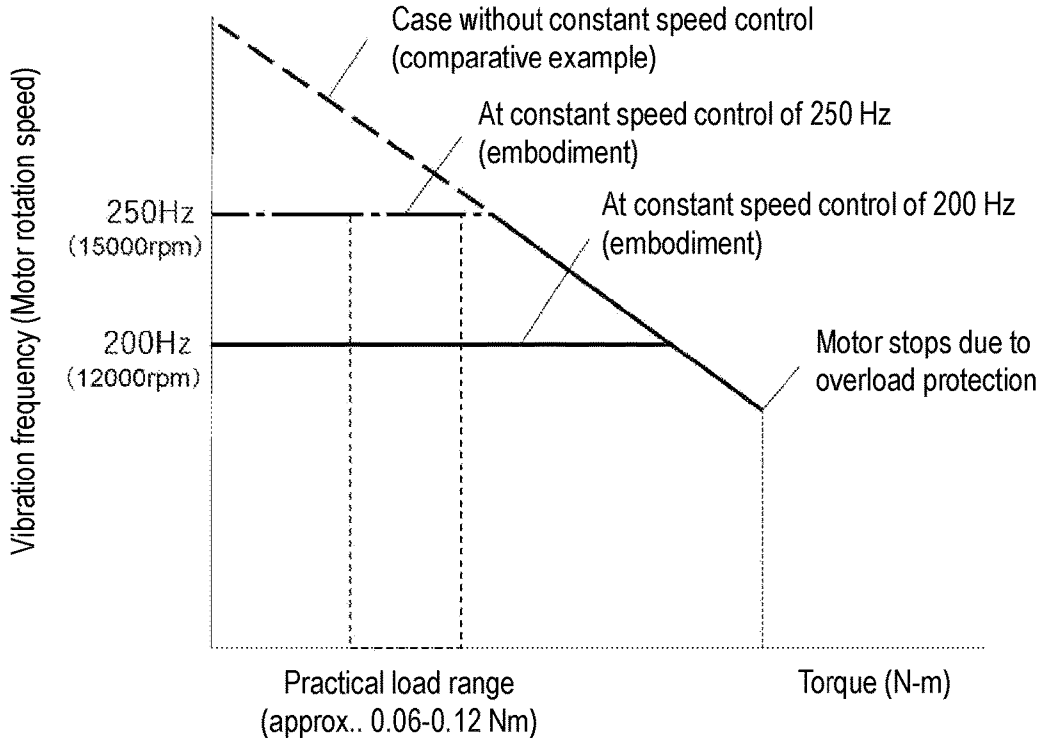
FIG. 28 is a graph illustrating a relationship between the vibration frequency of a tip tool 10 of the power tool 1 and the torque of a motor 6.

FIG. 28 is a graph illustrating a relationship between the vibration frequency of the tip tool 10 of the power tool 1, that is, the rotation speed of the motor 6, and the torque of the motor 6. The setting of the rotation speed of the constant speed control of the motor 6 at 200 Hz (12000 rpm) or 250 Hz (15000 rpm) can be switched by the operator by pressing the speed switch button 21. The computing part 34 drives the motor 6 to achieve the target rotation speed of 200 Hz by using a value (e.g., a duty ratio D1=60%) smaller than a PWM control duty ratio of 100%. 200 Hz (12000 rpm) is a rotation speed (vibration frequency) suitable for the compaction work. The compaction work serves to make the concrete excellent in terms of strength, water-tightness, and durability. The power tool 1 is used to defoam bubbles included in fresh concrete flowing into a mold for concrete construction. The computing part 34 drives the motor 6 to achieve the target rotation speed of 250 Hz by using a value (e.g., a duty ratio D2=80%) smaller than a PWM control duty ratio of 100%. 250 Hz (15000 rpm) is a rotation speed (vibration frequency) suitable for the driving work. The driving work serves to pour fresh concrete transported by a concrete mixer truck into a mold for concrete construction by using a pump. The power tool 1 is used in the work for causing the fresh concrete to flow and leveling the fresh concrete so that the height of the fresh concrete is uniform, or the work of pouring the fresh concrete to every corner of the mold, by applying vibration to the fresh concrete. The practical load range of the power tool 1 is 0.06 to 0.12 Nm. In such range, the rotation speed of the constant speed control is maintained. In FIG. 28, a graph of the comparative example in which the constant speed control of the motor 6 is not performed is also shown. As shown in the comparative example, in the case where the motor 6 is driven at a duty ratio D3=100% without the constant speed control, when the battery capacity drops or the load increases, since the duty ratio cannot be increased, the motor speed is low. In the state in which the rotation speed of the motor 6 is low and the target rotation speed is not met, defoaming at the time of compaction is insufficient and the work efficiency is low. Comparatively, in the embodiment, the control is exerted to reach the target speed in the state in which the duty ratio is less than 100%. Therefore, even if the battery capacity drops or the load increases, it is possible to increase the duty ratio. As a result, the target rotation speed can be maintained, the defoaming can be sufficient, and the work efficiency at the time of compaction can be high.

Figure 29:
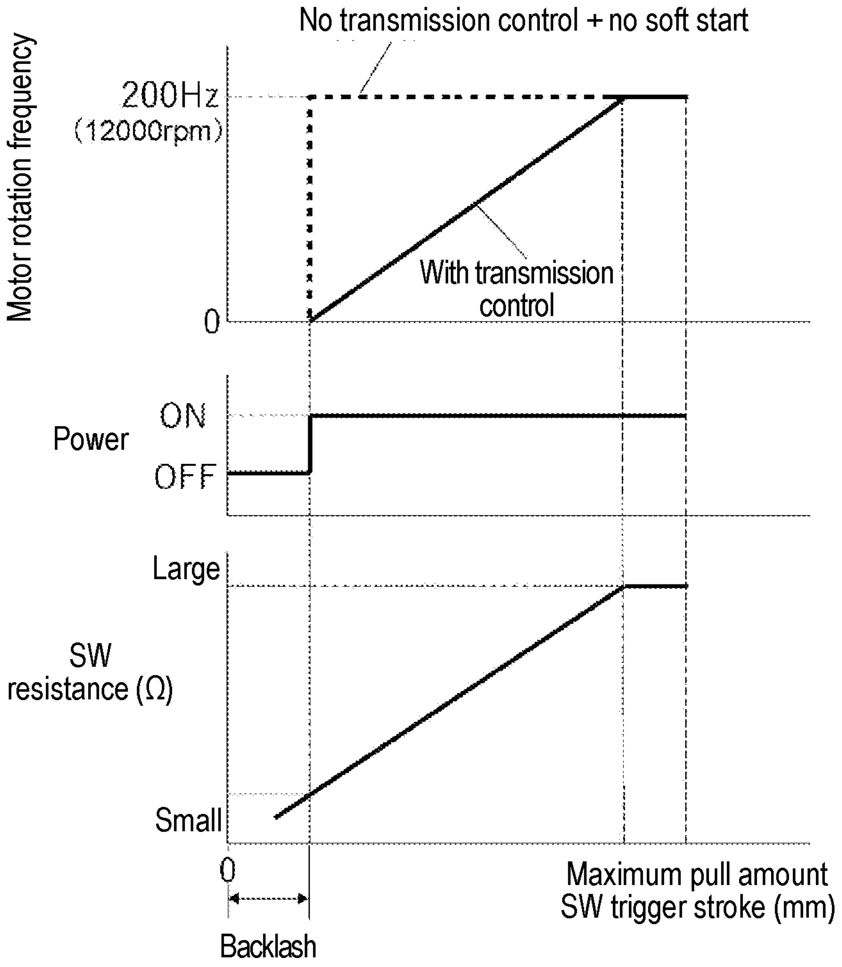
FIG. 29 is a time chart illustrating an example of the operation in accordance with a pull amount (operation amount) of a trigger switch 5 in the power tool 1.

FIG. 29 is a time chart illustrating an example of the operation in accordance with a pull amount (operation amount) of the trigger switch 5 in the power tool 1. The computing part 34 may also have a transmission control function which adjusts the rotation speed of the motor 6 in accordance with the pull amount of the trigger switch 5. FIG. 29 illustrates a relationship between the pull amount of the trigger switch 5 and the rotation speed of the motor 6 in the case where the transmission control is performed. When the pull amount of the trigger switch 5 exceeds a backlash, the power starts being supplied to the motor 6. As the pull amount of the trigger switch 5 increases henceforth, the rotation speed of the motor 6 also increases. When the rotation speed of the motor 6 reaches the target rotation speed of the constant speed control, even if the pull amount of the trigger switch 5 further increases, the rotation speed of the motor 6 remains unchanged. As shown in the broken line in FIG. 29, in the case where neither the transmission control nor the soft start control is performed, when the pull amount of the trigger switch 5 exceeds the backlash, the rotation speed of the motor 6 immediately increases drastically toward the target speed of the constant speed control.

According to the embodiment, the following effects can be achieved.

(1) The cover 17 has the latch mechanisms formed by the latch operation parts **17*a* and the latch claw parts 17*b* on the left side and the right side. Therefore, the cover 17 can grasp the latch operation parts 17*a* from the left-right direction, which is the traverse direction of the cover 17, to remove the engagement between the latch operation parts 17*a* and the claw parts 2*g*, thereby opening the cover 17**, making the power tool user-friendly.

(2) The correcting parts **23*a* are provided at the battery pack mount 2*c*, and the left side surface and the right side surface of the cover 17 are pressed outward by the correcting parts 23*a*. Therefore, even if the left side surface and the right side surface of the cover 17 are warped inward, the warping is corrected. Accordingly, the risk that the latch claw parts 17*b* of the cover 17 cannot be engaged with the claw parts 2*g* of the battery pack mount 2*c* due to warping can be suppressed, and the cover 17** can be reliably locked in the closed state, making the power tool user-friendly.

(3) With the correcting parts **23*a*, the reduction of the operation load required for removing the engagement of the latch mechanisms and the stable locking of the cover 17** by the latch mechanisms can be realized in a balanced manner, making the power tool user-friendly.

(4) The movable part 25 able to open and close is provided at the cover 17, and the cord 28 extending from the adapter 27 can be pulled out of the cover 17 via the opening part 17 formed in the open state of the movable part 25. Accordingly, the power tool 1 is configured to entirely cover, with the cover 17, the battery pack 4 mounted to the battery pack mount **2*c*, while being able to suitably cope with the adapter 27. Specifically, even in the case where the adapter 27 is mounted to the battery pack mount part 2*c* in place of the battery pack 4, the power tool 1 is still usable with the cover 17 being closed, and a foreign matter (concrete, etc.) can be suppressed from attaching to the adapter 27**, making the power tool user-friendly.

(5) The movable part 25 can be locked to the cover 17 in the open state, as shown in FIGS. 22 to 25. Therefore, it is not necessary to remove and separately keep the movable part 25, making the power tool user-friendly.

(6) The latch mechanisms are provided on the left side surface and the right side surface of the cover 17. Therefore, compared with the case where the latch mechanism is provided on the back surface of the cover 17, the interference of the movable part 25 provided on the back surface of the cover 17 to the latch mechanism can be suppressed.

(7) Since the operation panel 29 is configured to be covered by the cover 17, a foreign matter (concrete, etc.,) can be suppressed from attaching to the operation panel 20, making the power tool more operable.

(8) Since the battery pack 20 is configured to be covered by the cover 17 covering the battery pack 4, a separate cover for covering the operation panel 20 is not required. The number of parts, the cost, as well as the labor for cleaning can be reduced.

(9) Since the operator can switch the rotation speed of the motor 6, that is, the vibration frequency of the vibration part 11, by using the speed switch button 21 provided on the operation panel 20, the vibration frequency suitable for the work content and the viscosity of the material can be selected, making the power tool more operable.

(10) The motor 6 forming the load part is a brushless motor. Therefore, compared with the case where the motor 6 is a brushed motor, it is possible to exert a greater variety of control, making the power tool more operable. In addition, different from the case of a brushed motor, there is no exposed electrical contact. Therefore, the waterproofness is easily reinforced.

(11) Since the operation panel 29 is configured to be covered by the cover 17, a foreign matter (concrete, etc.,) can be suppressed from attaching to the operation panel 20, making the power tool more operable.

(12) Since the battery pack 20 is configured to be covered by the cover 17 covering the battery pack 4, a separate cover for covering the operation panel 20 is not required. The number of parts, the cost, as well as the labor for cleaning can be reduced.

(13) The cover 17 has the latch mechanisms formed by the latch operation parts 17*a* and the latch claw parts 17*b* on the left side and the right side. Therefore, the cover 17 can grasp the latch operation parts 17*a* from the left-right direction, which is the traverse direction of the cover 17, to remove the engagement between the latch operation parts 17*a* and the claw parts 2*g*, thereby opening the cover 17, making the power tool more operable.

(14) Since the operator can switch the rotation speed of the motor 6, that is, the vibration frequency of the vibration part 11, by using the speed switch button 21 provided on the operation panel 20, the vibration frequency suitable for the work content and the viscosity of the material can be selected, making the power tool more operable.

(15) The motor 6 forming the load part is a brushless motor. Therefore, compared with the case where the motor 6 is a brushed motor, it is possible to exert a greater variety of control, making the power tool more operable. In addition, different from the case of a brushed motor, there is no exposed electrical contact. Therefore, the waterproofness is easily reinforced.

(16) Since the computing part 34 includes the soft start control function of the motor 6, a large current at the time when the motor 6 starts and the overload to a circuit contact due to the large current can be suppressed. In addition, the scattering of the concrete attached to the vibration part 11 can also be suppressed.

(17) Since the computing part 34 includes the constant speed control function of the motor 6, the vibration frequency suitable for the work content can be maintained throughout the entire practical load range, making the power tool more operable. In addition, since the rotation speed of the motor 6 is not increased unnecessarily when there is no load, the power consumption can be suppressed, and the scattering of the concrete attached to the vibration part 11 can be suppressed as well.

(18) Since the computing part 34 includes the brake control function of the motor 6, when the operator turns off the trigger switch 5, the motor 6 can be quickly stopped, making the power tool user-friendly.

Figure 30:
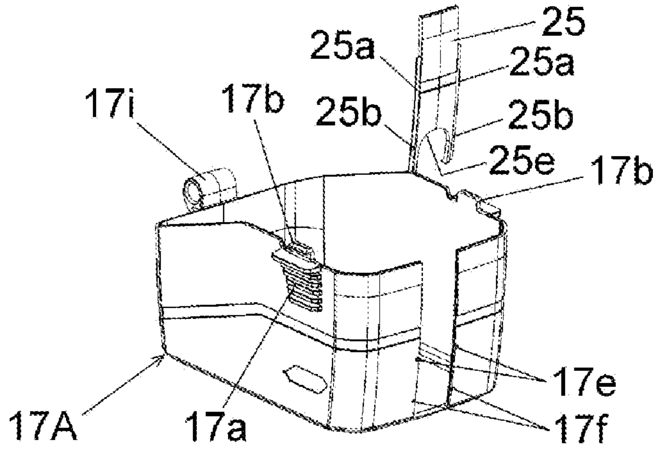
FIG. 30 is a perspective view of a cover 17A of a power tool according to Embodiment 2 of the invention in a state in which the movable part 25 is separated.
Figure 31:
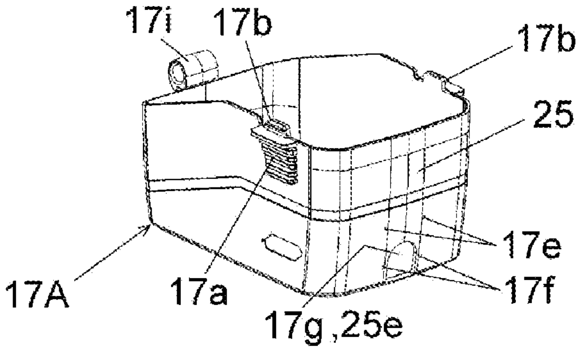
FIG. 31 is a perspective view of the cover 17A in a state in which the movable part 25 is attached.
Figure 32:
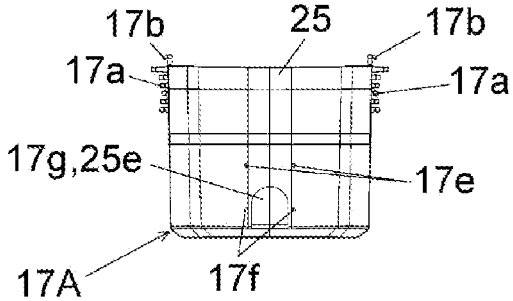
FIG. 32 is a back view of the same.
Figure 33:
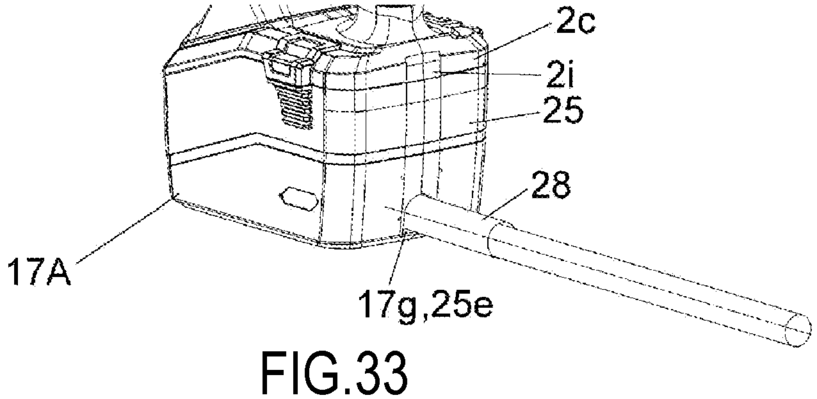
FIG. 33 is a perspective view of main components of the power tool according to Embodiment 2 in a state in which an adapter is mounted to the battery pack mount 2*c*.
Figure 34:
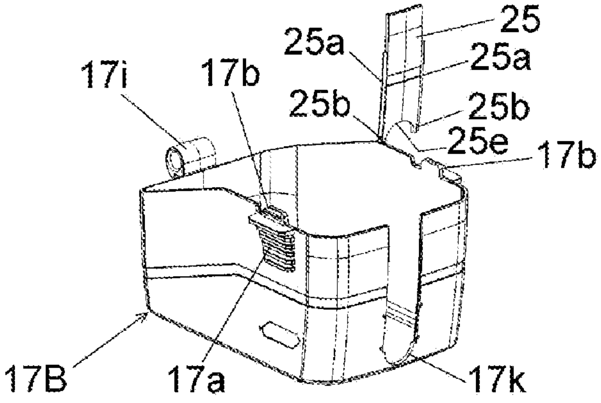
FIG. 34 is a perspective view of a cover 17B of a power tool according to Embodiment 3 of the invention in a state in which the movable part 25 is separated.
Figure 35:
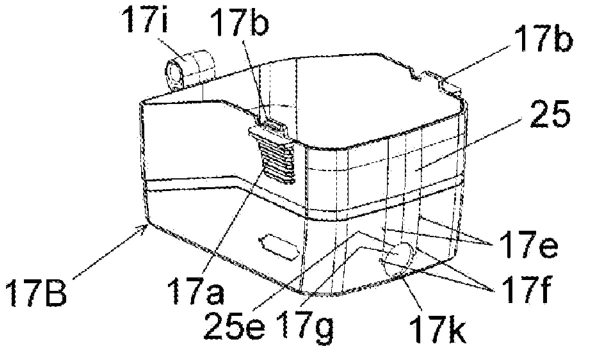
FIG. 35 is a perspective view of the cover 17B in a state in which the movable part 25 is attached.
Figure 36:
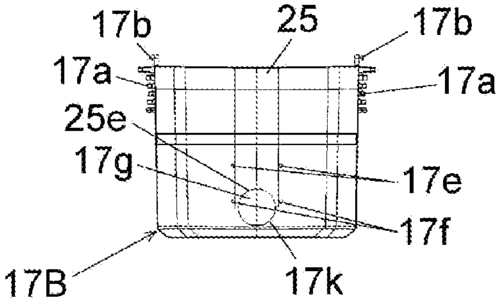
FIG. 36 is a back view of the same.
Figure 37:
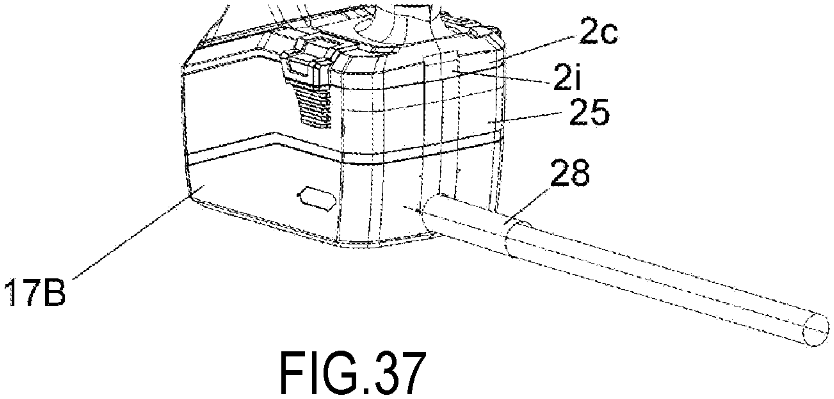
FIG. 37 is a perspective view of main components of the power tool according to Embodiment 3 in a state in which an adapter is mounted to the battery pack mount 2*c*.

(Embodiment 2) Embodiment 30 of the invention will be described with reference to FIGS. 2 to 33. Compared with the power tool of Embodiment 1, the power tool of the embodiment differs in that a cover 17A replaces the cover 17, and the rest are the same. The cover 17A has the same configuration as the cover 17, except for the shape of the movable part 25. As shown in FIG. 30, in the cover 17A, the lower end of the movable part 25 has a notch part 25*e*. In the state where the movable part 25 is mounted, the notch part 25*e* forms the opening part 17*g* as shown in FIGS. 31 and 32. The inner edge of the notch part 25*e* is in a U shaped. Such inner edge has a curved (arced) portion along the outer circumferential surface of the upper half of the cord 28, and is close to or in contact with the outer circumferential surface of the upper half of the cord 28. According to the embodiment, compared with Embodiment 1, the area of the gap between the cord 28 and the inner edge of the opening part 17*g* is reduced. Therefore, the effect of suppressing a foreign matter from attaching to the adapter 27 is increased.

(Embodiment 3) Embodiment 3 of the invention will be described with reference to FIGS. 34 to 37. Compared with the power tool of Embodiment 2, the power tool of the embodiment differs in that a cover 17B replaces the cover 17A, and the rest are the same. Compared with the cover 17A, the cover 17B differs in that an edge part 17*k* facing the lower end of the movable part 25 is in a curved shape (arced shape) along the outer circumferential surface of the lower half of the cord 28, and that the inner edge of the notch part 25*e* of the movable part 25 is connected with the edge part edge part 17*k* and has a curved shape (arced shape) along the outer circumferential surface of the upper half of the cord 28, and the rest are the same. The edge part 17*k* and the inner edge of the notch part 25*e* are assembled together to form a circumferential shape (closed curve shape) along the outer circumferential surface of the cord 28, and are close to or in contact with the outer circumferential surface of the cord 28 throughout the entire circumference. According to the embodiment, compared with Embodiment 2, the area of the gap between the cord 28 and the inner edge of the opening part 17*g* is further reduced. Therefore, the effect of suppressing a foreign matter from attaching to the adapter 27 is further increased.

Figure 38:
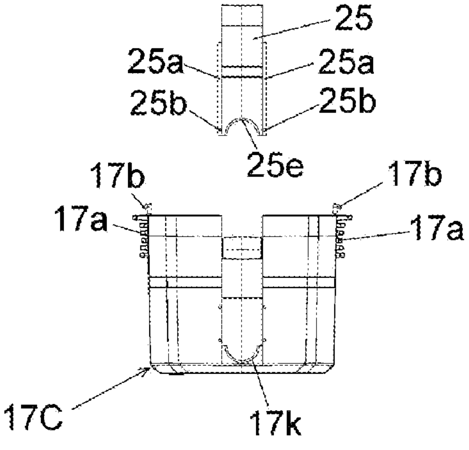
FIG. 38 is a back view of a cover 17C of a power tool according to Embodiment 4 of the invention in a state in which the movable part 25 is separated.
Figure 39:
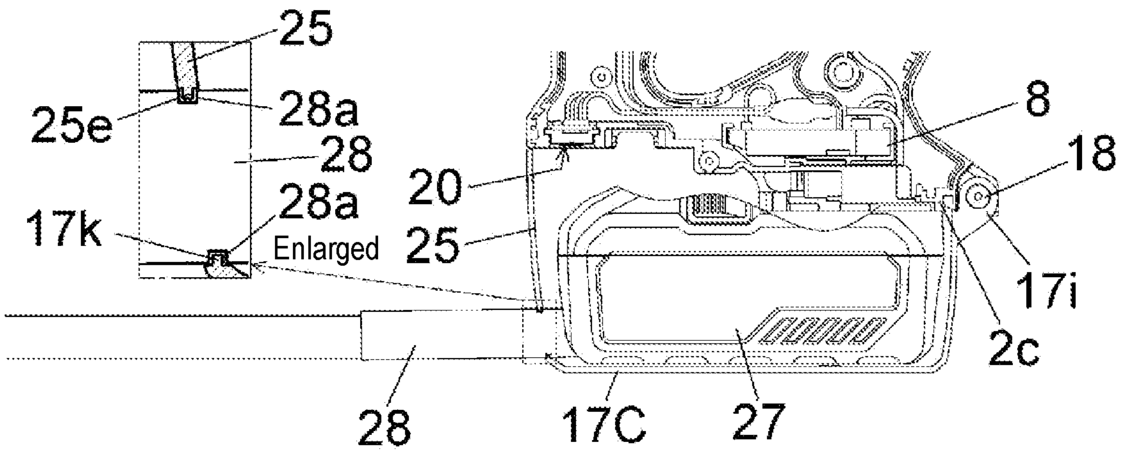
FIG. 39 is a cross-sectional e view of main components of the power tool according to Embodiment 4 in a state in which the adapter 27 is mounted to the battery pack mount 2*c*.

(Embodiment 4) Embodiment 4 of the invention will be described with reference to FIGS. 38 and 39. Compared with the power tool of Embodiment 3, the power tool of the embodiment differs in that a cover 17C replaces the cover 17B, and the rest are the same. Compared with the cover 17B, the cover 17C differs in that an engagement part between the edge part 17*k* and the outer circumferential surface of the lower half of the cord 28 forms a spigot structure, and an engagement part between the inner edge of the notch part 25*e* of the movable part 25 and the outer circumferential surface of the upper half of the cord 28 forms a spigot structure, and the rest are the same. The edge part 17*k* and the inner edge of the notch part 25*e* are respectively formed as protrusive strips. A recessed strip 28*a* is provided on the outer circumferential surface of the cord 28. The recessed strip 28*a* goes around the entire circumference of the outer circumferential surface of the cord 28 to be enclosed. The edge part 17*k* and the inner edge of the notch part 25*e* are fit into the recessed strip 28*a* of the cord 28 to form the spigot structure. According to the embodiment, by adopting the spigot structure, the effect of suppressing a foreign matter from attaching to the adapter 27 is superior to that of Embodiment 3. It may also be that only one of the engagement part between the edge part 17*k* and the outer circumferential surface of the lower half of the cord 28 and the engagement part between the inner edge of the notch part 25*e* of the movable part 25 and the outer circumferential surface of the upper half of the cord 28 is the spigot structure.

Although the present invention has been described above by taking the embodiment as an example, it is understood by those skilled in the art that various modifications can be made to each component and each processing process of the embodiments within the scope of the claims. In the following, modified examples are described.

The correcting parts 23*a* may also be provided at the cover part 17. It may also be that elastic bodies, such as rubber or sponge, are embedded between the inner side of the left side surface and the right side surface of the cover 17 and the outer side of the left side surface and the right side surface of the adapter 27, and the elastic bodies are used as the correcting parts. In such case, the elastic bodies are also capable of preventing the battery pack 4 or the adapter 27 from rattling. In addition, the movable part 25 may be transparent or semi-transparent, and the inside of the cover 17 is viewable from the outside of the cover 17 through the movable part 25. By doing so, even if the cover 17 is mounted, a display part such as a remaining capacity display part 4*e* provided in the battery pack 4 located inside the cover 17 and the operation panel 20 provided in the vicinity of the rear end of the lower surface of the battery pack mount 2*c* is visible without opening the cover 17. Therefore, the power tool can be more user-friendly. The entire cover 17 may also be transparent or semi-transparent.

In Embodiment 1, in the case where the adapter 27 is mounted to the battery pack mount 2*c*, the power tool may be used in a state in which the movable part 25 is removed. In such case, the effect of suppressing foreign matter attachment to the adapter 27 deteriorates, and it is necessary to separately keep the movable part 25. However, regarding other points, the same functions/effects can still be achieved. The cover 17 may also be a slide-type cover detachable by sliding to the lower end of the housing 2. The power tool of the invention may also be of a type other than a concrete vibrator.

What is claimed is:

1. A handheld power tool, comprising:
- a load part;
- an operation part, operated by an operator to switch an operation of the load part;
- a housing, accommodating the load part;
- a battery pack mount which is provided in the housing, and to which a battery pack serving as a driving source of the load part is able to be attached and detached; and
- a cover, capable of covering the operation part and the battery pack mounted to the battery pack mount,
- wherein the cover is supported by the housing to be able to open and close, and is configured to cover the operation part and the battery pack mounted to the battery pack mount in a closed state of the cover, and
- wherein the operation part is positioned so as to be operable by an operator when the battery pack is mounted to the battery pack mount and the cover is opened, and not to be operable by an operator when the cover is closed.

2. The handheld power tool as claimed in claim 1,
- wherein the cover is configured to be able to open and close with respect to the housing by a latch mechanism locking the cover in the closed state with respect to the housing.

3. The handheld power tool as claimed in claim 1, having a correcting part capable of correcting a shape of the cover,
- wherein the correcting part corrects the shape of the cover by contacting the cover when the cover is closed.

4. The handheld power tool as claimed in claim 3,
- wherein the correcting part has a correcting force that is a force acting in a direction pressing the cover outward.

5. The handheld power tool as claimed in claim 3,
- wherein a movable part able to open and close is provided at the cover,
- in a case where the battery pack is mounted to the battery pack mount, the movable part is usable in a closed state,
- in an open state of the movable part, an opening part through which a cord extending from the adapter mounted to the battery pack mount extends out of the cover is formed, or, in a mounted state of the movable part, the opening part through which the cord extending from the adapter mounted to the battery pack mount extends out of the cover is formed.

6. The handheld power tool as claimed in claim 5,
- wherein an engagement part of the cord with at least one of the movable part and the cover forms a spigot structure.

7. The handheld power tool as claimed in claim 5,
- wherein the housing has a handle part extending upward from the battery pack mount,
- in the open state of the movable part, an upper end of the movable part is located at a same height as or lower than a lower end of the handle part.

8. The handheld power tool as claimed in claim 1,
- wherein the load part is a brushless motor, and has a stator, a rotor rotatable with respect to the stator, and a coil provided at the stator,
- the handheld power tool comprises a control part controlling rotation of the brushless motor, and
- the operation part has a switch which switches a rotation speed of the brushless motor by an operation of a user.

9. The handheld power tool as claimed in claim 8,
- wherein, in a case where a load applied to the brushless motor is in a predetermined range, the control part performs constant speed control maintaining a rotation speed of the brushless motor regardless of the load.

10. The handheld power tool as claimed in claim 8,
- wherein the handheld power tool is a concrete vibrator having a tip tool inserted into fresh concrete and vibrated by the load part,
- the control part is able to change a rotation speed of the brushless motor in accordance with an external operation.

11. The handheld power tool as claimed in claim 1,
- wherein the housing comprises a motor accommodation part accommodating a motor as the load part, a handle part extending in an upper-lower direction, and the battery pack mount; an upper end of the handle part being connected to the motor accommodation part and a lower end of the handle part being connected to the battery pack mount,
- wherein the battery pack and the operation part are disposed at a lower surface of the battery pack mount with a gap therebetween, the operation part being operable by an operator through the gap when the battery pack is attached to the battery pack mount and the cover is opened.

12. The handheld power tool as claimed in claim 11, wherein the battery pack comprises an inclined surface inclined with respect to the lower surface of the battery pack mount, the gap being formed between the inclined surface of the battery pack and the operation part.

* * * * *